United States Patent
Hazeghi et al.

(10) Patent No.: US 9,521,399 B1
(45) Date of Patent: *Dec. 13, 2016

(54) DYNAMICALLY RECONFIGURABLE OPTICAL PATTERN GENERATOR MODULE USEABLE WITH A SYSTEM TO RAPIDLY RECONSTRUCT THREE-DIMENSIONAL DATA

(71) Applicant: AQUIFI, INC., Palo Alto, CA (US)

(72) Inventors: Aryan Hazeghi, Stanford, CA (US); Carlo Dal Mutto, Sunnyvale, CA (US); Abbas Rafii, Palo Alto, CA (US); David Demirdjian, Boca Raton, FL (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,155

(22) Filed: Apr. 25, 2016

Related U.S. Application Data

(63) Continuation of application No. 14/788,795, filed on Jul. 1, 2015, now Pat. No. 9,325,973.

(Continued)

(51) Int. Cl.
*H04N 13/02* (2006.01)
*H04N 5/33* (2006.01)
(Continued)

(52) U.S. Cl.
CPC ...... *H04N 13/0271* (2013.01); *G02B 27/4227* (2013.01); *G02B 27/4272* (2013.01); *G06K 9/00335* (2013.01); *G06T 7/0057* (2013.01); *H04N 5/332* (2013.01); *H04N 13/0239* (2013.01); *H04N 13/0253* (2013.01); *H04N 13/0296* (2013.01); *G06T 2207/10028* (2013.01)

(58) Field of Classification Search
CPC .................................................. H04N 13/0271
See application file for complete search history.

(56) References Cited

U.S. PATENT DOCUMENTS

| | | | |
|---|---|---|---|
| 8,749,796 B2 * | 6/2014 | Pesach | G01B 11/25 356/610 |
| 8,995,057 B2 * | 3/2015 | Miyasaka | G01B 11/25 359/566 |

(Continued)

*Primary Examiner* — James Pontius
(74) *Attorney, Agent, or Firm* — Michael A. Kaufman, Esq.

(57) ABSTRACT

Dynamic projection of at least first and second patterns contributes detectable disparity onto a scene that includes a target object. The scene is imaged with two-dimensional cameras whose acquired imagery includes disparity contributions whose presence enable a three-dimensional reconstruction depth map to be rapidly and accurately generated. In one embodiment coherent light is input to a first DOE within whose near range output is disposed a second DOE, whose far range output projects an image. Electronically varying effective optical distance between the two DOEs varies the pattern projected from the second DOE. A processor system and algorithms enable dynamic intelligent selection of projected patterns to more readily discern target object characteristics: shape, size, velocity. Patterns can implement spatio-temporal depth reconstruction, spatio-temporal depth reconstruction, and even single-camera spatio-temporal light coding reconstruction. Target objects may be scanned or may make gestures that are rapidly detected and recognized by the system and method.

20 Claims, 8 Drawing Sheets

Related U.S. Application Data

(60) Provisional application No. 62/022,086, filed on Jul. 8, 2014.

(51) Int. Cl.
*G06K 9/00* (2006.01)
*G06T 7/00* (2006.01)
*G02B 27/42* (2006.01)

(56) References Cited

U.S. PATENT DOCUMENTS

| | | | | |
|---|---|---|---|---|
| 2002/0071472 | A1* | 6/2002 | Dickson | G02B 5/32 |
| | | | | 372/102 |
| 2002/0196415 | A1* | 12/2002 | Shiratani | G01B 11/25 |
| | | | | 353/31 |
| 2009/0185274 | A1* | 7/2009 | Shpunt | G02B 27/0944 |
| | | | | 359/558 |
| 2010/0284082 | A1* | 11/2010 | Shpunt | G01B 11/25 |
| | | | | 359/558 |
| 2013/0294468 | A1* | 11/2013 | Sridharan | H01S 3/10007 |
| | | | | 372/29.02 |
| 2015/0234291 | A1* | 8/2015 | Patra | G03F 7/70158 |
| | | | | 355/67 |

* cited by examiner

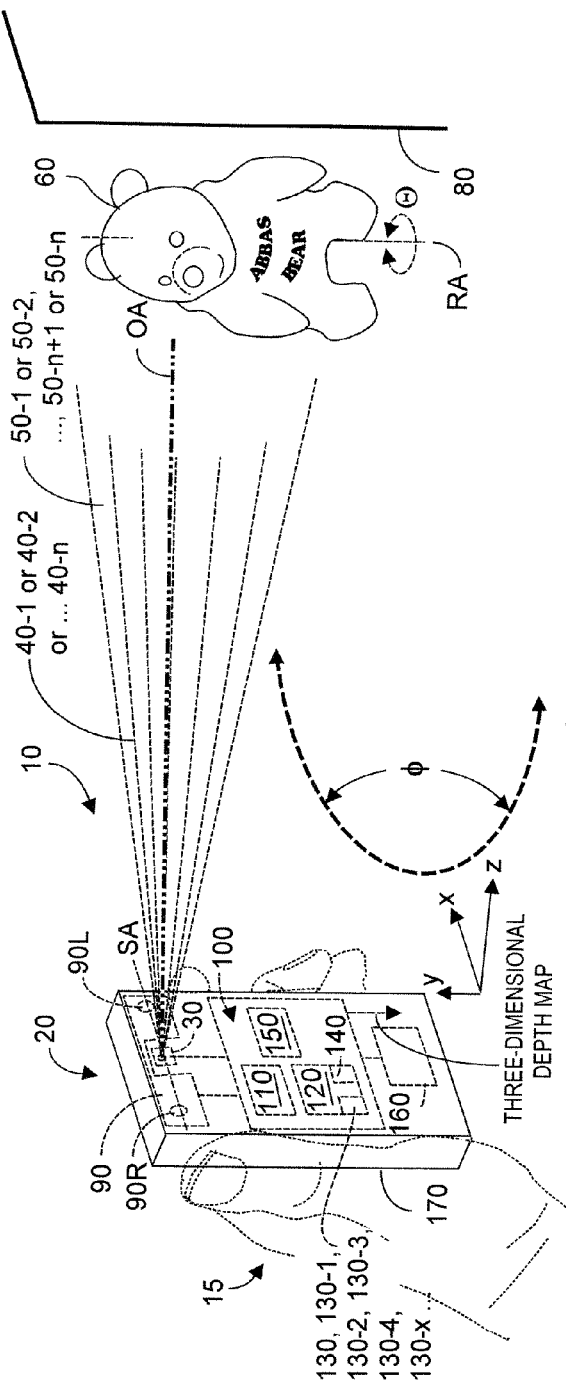
FIG. 1A
FIG. 1C
FIG. 1B

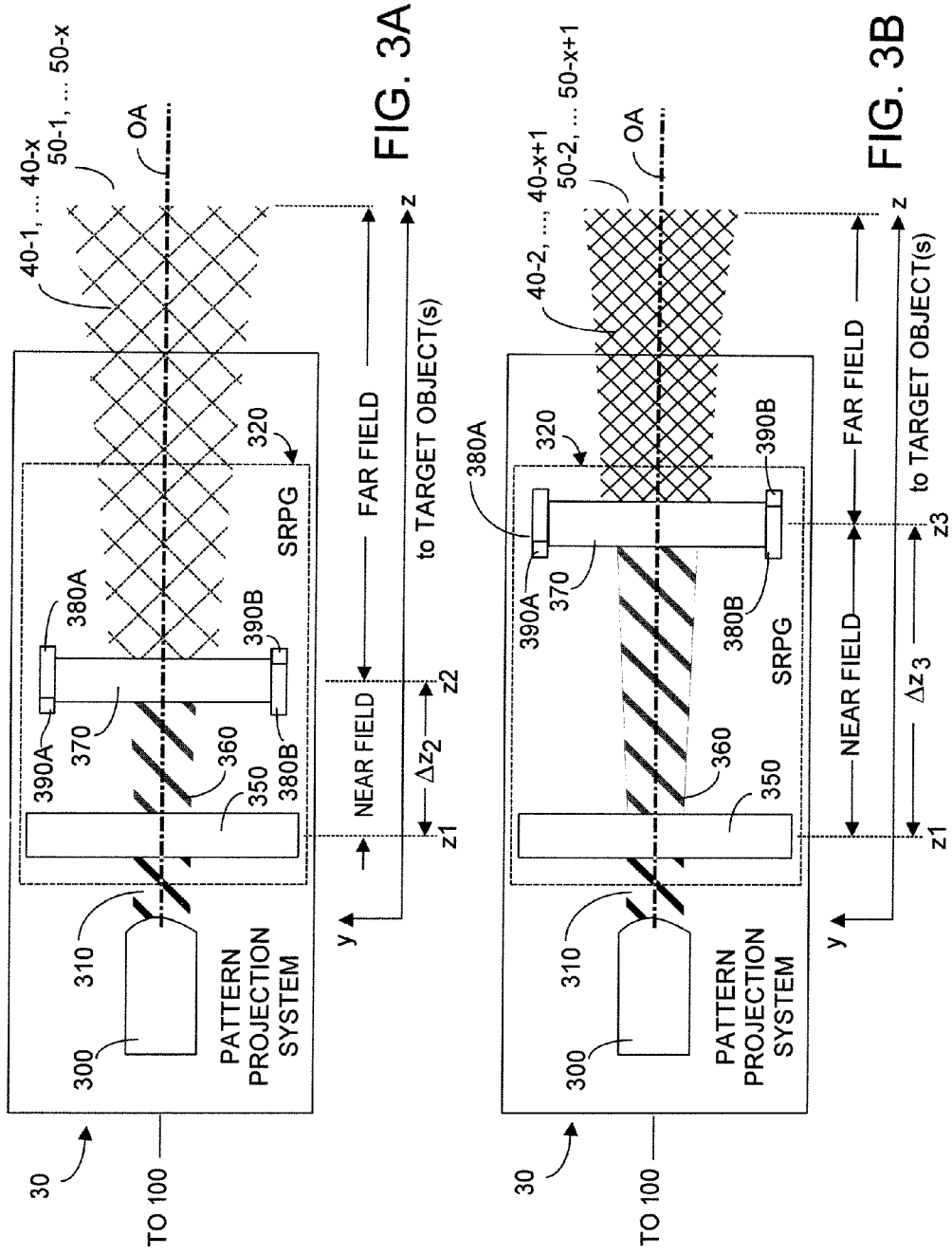

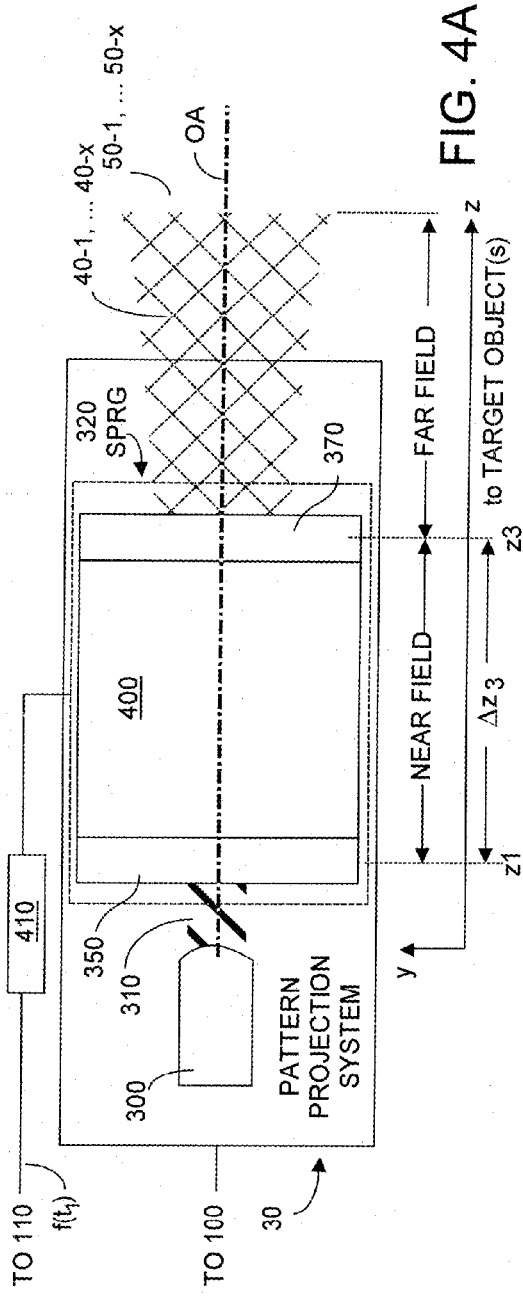
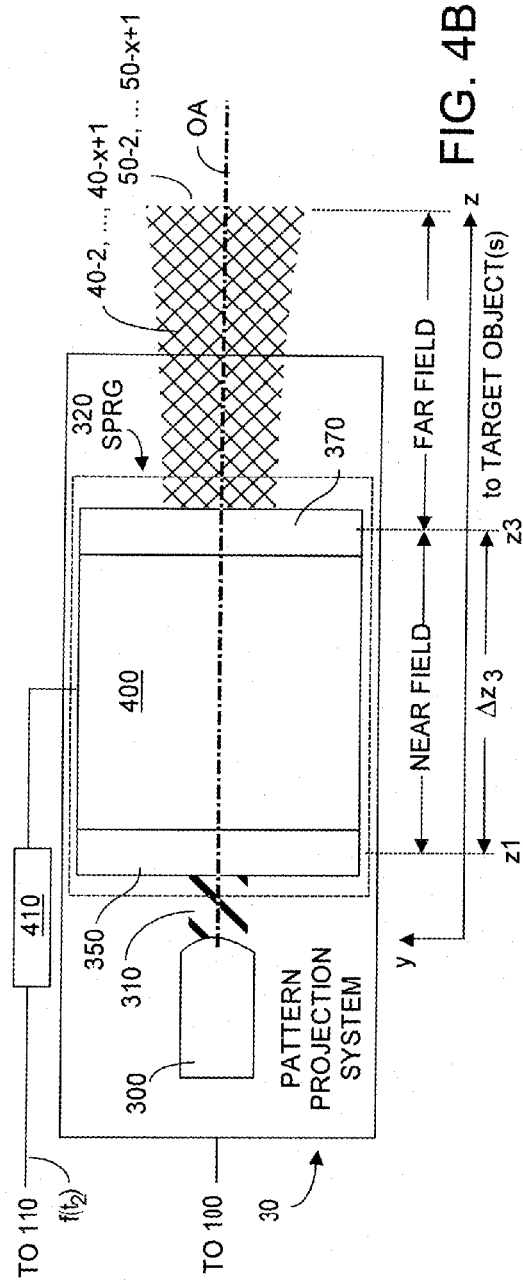

DYNAMICALLY RECONFIGURABLE OPTICAL PATTERN GENERATOR MODULE USEABLE WITH A SYSTEM TO RAPIDLY RECONSTRUCT THREE-DIMENSIONAL DATA

PRIORITY TO CO-PENDING APPLICATION

This is a continuation of utility patent application Ser. No. 14/788,795 filed 1 Jul. 2015 and soon to issue as U.S. Pat. No. 9,325,973. The '795 application claimed priority from then U.S. provisional patent application Ser. No. 62/022,086 filed 8 Jul. 2014 entitled "Fast Multi-Pattern Generation System for 3D Reconstruction". Said provisional patent application is incorporated herein in full by reference.

FIELD OF THE INVENTION

The present invention relates generally to two-dimensional systems and methods to rapidly capture high quality depth maps of an imaged scene within a video stream. The captured data is used preferably in real-time to reconstruct three-dimensional (x,y,z) image data. In some applications the system is rotated relative to a target object so as to scan and acquire an (x,y,z) set of coordinates representing the surface of the scanned target object. In other applications, the system is stationery and captures imagery of a target object that may move. In such applications the (x,y,z) data is used to identify target objects in the imaged scene, and any gestures made by the target object. More specifically the present invention is directed to two-dimensional systems, especially battery powered mobile two-dimensional systems, that project at least one known light pattern onto a scene and attempt to reconstruct three-dimensional image data by evaluating disparity within the imaged scene. The projected light patterns facilitate image scanning of a target object, and facilitate recognition of gestures made by imaged human target objects.

BACKGROUND OF THE INVENTION

Imaging systems that optically examine a scene to discern target object(s) within, and then try to discern three-dimensional information as to the imaged scene and target object(s) are known in the art. Imaging systems typically employ an optical acquisition system to acquire images of a scene that may include at least one target object of interest, perhaps a human user or a portion of such user's body. In addition, imaging systems further include a processing system to process data acquired by the optical acquisition system, to discern desired three-dimensional information regarding the imaged scene.

In so-called time-of-flight (TOF) imaging systems the optical acquisition system emits optical energy whose return echoes are examined by a TOF camera system to acquire true three-dimensional data from the imaged scene. Exemplary TOF imaging systems were developed by Canesta, Inc. and are described in numerous patents to Canesta, Inc., now assigned to Microsoft, Inc. However TOF imaging systems can be expensive and may be unsuitable for battery operated portable use due to their large form factor and substantial operating power requirements.

Other imaging systems that employ two-dimensional optical acquisition systems are also known in the art. Such optical acquisition systems acquire two-dimensional image data that is processed to reconstruct three-dimensional image data. In some such systems the optical acquisition system includes at least two spaced-apart two-dimensional cameras. Exemplary such systems have been developed by Imimtek, Inc. (subsequently renamed Aquifi, Inc.) and are described in numerous patents assigned to Aquifi, Inc. of Palo Alto, Calif. The acquired two-dimensional data is processed such that a small number of landmark points sufficient to recognize an imaged target object are rapidly determined. Other less sophisticated two-camera imaging systems attempt to acquire stereographic two-dimensional images from which three-dimensional data can perhaps be discerned. But three-dimensional space/time reconstruction algorithms commonly used with such systems are not very useful when imaging dynamic scenes. This is because stereo matching must confront fundamental problems associated with triangulation, and more challengingly with correspondence estimation, which is associating points between images of the same scene acquired by the two spaced-apart two-dimensional cameras. Estimation of correspondences generally involves locally comparing one image in proximity to a specific point with the second image in proximity of any possible match. Local comparison is based on spatial image similarity, e.g., absolute difference. In practice, the imaged scene may change too fast for real-time stereo matching data to be computed.

In other so-called structured light imaging systems the optical acquisition system includes a generator that projects a calibrated pattern of light onto the imaged scene, and employs a pair of two-dimensional cameras that image the scene. Typically the light pattern is generated using a passive immutable diffractive optical element (DOE) that transforms an incoming optical wavefront into a desired but immutable (i.e., not changeable) output light pattern for projection onto the imaged scenery. DOES are diffraction-based and redirect light away from dark pattern regions, thus promoting efficiency and low power consumption.

In structured-light systems, the projected light pattern typically becomes altered when falling upon different surfaces in the imaged scene. For example a projected light pattern may appear distorted when projected onto differently shaped target object surfaces in the imaged scene, or may appear less focused and less intense when projected onto more distant regions of the imaged scene. The scene and projected light patterns is acquired by an optical acquisition system. Two-dimensional image data from the optical acquisition system is processed to determine surfaces and shapes of imaged object(s) that could produce the acquired observed light pattern distortion. Exemplary structured-light systems are described in patents to Prime Sense, Inc., now assigned to Apple, Inc. Some structured light systems employ the above-described space/time methodology by repeatedly computing the absolute difference for several acquisitions of the same scene on which different patterns are projected. But while this approach may work with fairly stationary images, it is difficult in practice to carry out real-time computations needed to reconstruct three-dimensional data where object(s) in the imaged scene are dynamic rather than stationary.

Structured light systems would benefit if projected patterns could somehow be changed dynamically in real-time. For example such dynamically changeable patterns could better accommodate target objects lacking suitable texture and/or shape to better enable a processing system to discern small shifts or disparities between frames of optical data acquired from at least two two-dimensional cameras in an optical acquisition system. Other projectable patterns might be useful to discern over a spatial dynamic range to more readily determine depth estimates to target objects that may be relatively close or far, or to more rapidly accommodate temporally rapidly changing target objects as opposed to less dynamically changing imagery. But while DOEs are robust, passive, and inexpensive to fabricate, in optical projection applications they are designed and fabricated to satisfy a specific optical energy input/output transfer function. In response to incoming optical energy, the DOE produces, or outputs, a single immutable pattern of structured optical energy in the so-called spatial frequency or holographic order space. However, the output pattern is immutable and cannot be changed without physically altering the internal construction of the DOE to alter its transfer function. In practice internally modifying a DOE on-the-fly to dynamically change its output pattern of optical energy is not possible.

One prior art approach to creating changing patterns of light projections on-the-fly might uses digital light processing (DLP) projection system, including MEMS digital micro-mirror devices (DMD). But in practice, DLP systems are not suited for battery operable mobile structured light systems. This is due to their relatively high cost, complex optics with resultant large form factor, high power consumption in the many watt range, and relatively narrow projection fields of view. Such prior art projectors redirect light rays onto a scene to generate bright pattern regions. But such projectors waste optical energy by redirecting light away from the scene onto a heatsink to generate dark pattern regions. This is very inefficient and wasteful of operating power, especially when compared to inexpensive, small form factor diffraction-based DOEs that merely redirect light away from dark pattern regions. Prior art projection systems incorporating liquid crystal on silicon projectors are also characterized by high energy losses. While DOEs operate over a more limited wavelength than projector-type devices, they provide a larger effective aperture and promote efficiency. By contrast substantial energy losses exit in other prior art projection technologies including liquid crystal on silicon projectors. In short, creating and projecting dynamically reprogrammable projection patterns for use in a low power consumption, inexpensive, small form factor system is not a trivial problem.

What is needed is a method and system whereby three-dimensional image data can be rapidly reconstructed for an optical acquisition system comprising two-dimensional cameras and a pattern generator. Three-dimensional reconstruction including space/time methods of three-dimensional reconstruction should work successfully even if the optical acquisition system images dynamic scenes including dynamic target object(s), and/or target objects that are relatively near or relatively far from the optical acquisition system, and/or target objects whose surface may be texturally unremarkable or even planar. Preferably such three-dimensional reconstruction should be implementable such that an overall system is inexpensive to fabricate, has small form factor and low power consumption enabling battery operation in mobile devices. Embodiments of such a system should be useful to scan a target object, and to recognize user gestures made by a target object.

The present invention provides such methods and systems.

SUMMARY OF THE INVENTION

The present invention provides a compact, low power consumption pattern projection system that creates and projects at least first and second patterns sequentially onto a scene that includes target objects. Depending upon the embodiment, the system may be used to scan the target object, or may be used to acquire and recognize gestures made by the target object, which typically is at least part of a human making the gestures. The patterns falling upon target objects can augment parallax information when the scene is imaged. The pattern projection system is useable with two-dimensional imaging systems that imagine a scene using a pair of two-dimensional cameras and try to reconstruct a three-dimensional (x,y,z) image map from the optically acquired image data. The use of at least first and second patterns contributes to the robust and efficient detection of disparity in the imagery acquired by the system, and facilitates more rapid and precise depth estimation and target object identification and (x,y,z) data reconstruction.

The ability to project different patterns onto the imaged scene, especially patterns that can be dynamically tailored to the perceived target objects, can expedite reconstruction of an accurate three-dimensional image map, with improved signal/noise characteristics. In a scanning embodiment, the different projected patterns can facilitate forming an accurate (x,y,z) representation of the surface of the target object, even if its surface is perhaps fuzzy fur, or if its shape is potentially ambiguous, perhaps a bean bag. In a gesture acquisition embodiment, if target objects are moving rapidly, perhaps a rapid movement of a human head, a first type of patterns may be favored, whereas if the target objects appear to have certain contours or shapes or surfaces, a second type of patterns may be favored. The present invention in its various embodiments can work with the two-dimensional imaging system in closed-loop feedback fashion to substantially optimize pattern generation and projection on-the-fly as appropriate to the nature of the scene being imaged at a given time.

The pattern generator system preferably includes a source of collimated light that is input to a spatially reconfigurable pattern generator (SRPG), whose output is projectable first and second patterns that appear sequentially in the image scene. In some embodiments the SRPG includes a first diffractive optical element (DOE) and a spaced-apart second DOE, where the spaced-apart distance $\Delta_z$ is electronically controllable by at least one mechanical actuator under command of a processor system associated with the system including the pattern generator system. The first DOE received optical energy from the light source, and the distance $\Delta_z$ is within the optical near-field of the first DOE. The projectable patterns appear within the optical far-field of the second DOE and are dynamically changeable with changes in $\Delta_z$ as small as a few microns. In such embodiments the effective optical distance within the SRPG is electronically controlled mechanically in that one DOE is mechanically repositioned with respect to the other DOE.

In other embodiments the SRPG includes a spatial light modulator (SLM) that includes at least one diffractive element that receives output from the light source and in turn outputs at least first and second projectable patterns. Such embodiments include a first DOE and a spaced apart second DOE, but the two DOEs are stationary with respect to each other. Disposed and indeed sandwiched between the two DOEs is a liquid crystal SLM whose internal pixel characteristics are electronically controllably, without movement of any components comprising the SRPG. In response to electronic control signals, the SLM alters the effective optical length of the SRPG to values less than or equal to the physical separation distance between the first and second DOE. As the effective optical length is caused to change, without moving parts, different projectable patterns are output from the second DOE: The SLM may be a liquid crystal LC-SLM, that may be actuator controlled and is operated in transmissive mode.

Other aspects of the present invention describe SRPG design, and use of multiple patterns to implement a spatio-temporal depth reconstruction, and a spatio-temporal depth reconstruction, using the depth images acquired by the two cameras. In one embodiment, the second camera is not used and a single-camera spatio-temporal light coding reconstruction method is used.

Other features and advantages of the invention will appear from the following description in which the preferred embodiments have been set forth in detail, in conjunction with their accompanying drawings.

BRIEF DESCRIPTION OF THE DRAWINGS

FIG. 1A depicts a spatially dynamically reconfigurable optical pattern generator (SRPG) module used with a system to rapidly scan and acquire multiple two-dimensional images of a target object from which to reconstruct three-dimensional (x,y,z) image data of the target object from various acquisition angles, according to embodiments of the present invention;

FIG. 1B and FIG. 1C depict different views of the target object acquired from different acquisition angles in FIG. 1A, as well as first and second exemplary patterns projected from the optical pattern generator of FIG. 4A, projected upon the target object, as though such patterns were visible to the human eye, according to embodiments of the present invention;

FIG. 3A and FIG. 3B depict an electronically spatially reconfigurable optical pattern generator (SRPG) including a module with first and second DOEs and a mechanical actuator mechanism in which varying $\Delta_z$ varies the projectable pattern, according to embodiments of the present invention;

FIG. 4A and FIG. 4B depicts an electronically spatially reconfigurable optical pattern generator (SRPG) that includes first and second stationary DOEs that sandwich a liquid crystal spatial light modulator (SLM) whose internal pixel characteristics are altered electronically to change effective optical length and wave-front phase information without any moving parts, according to embodiments of the present invention;

DETAILED DESCRIPTION OF THE PREFERRED EMBODIMENTS

Figure 2A:
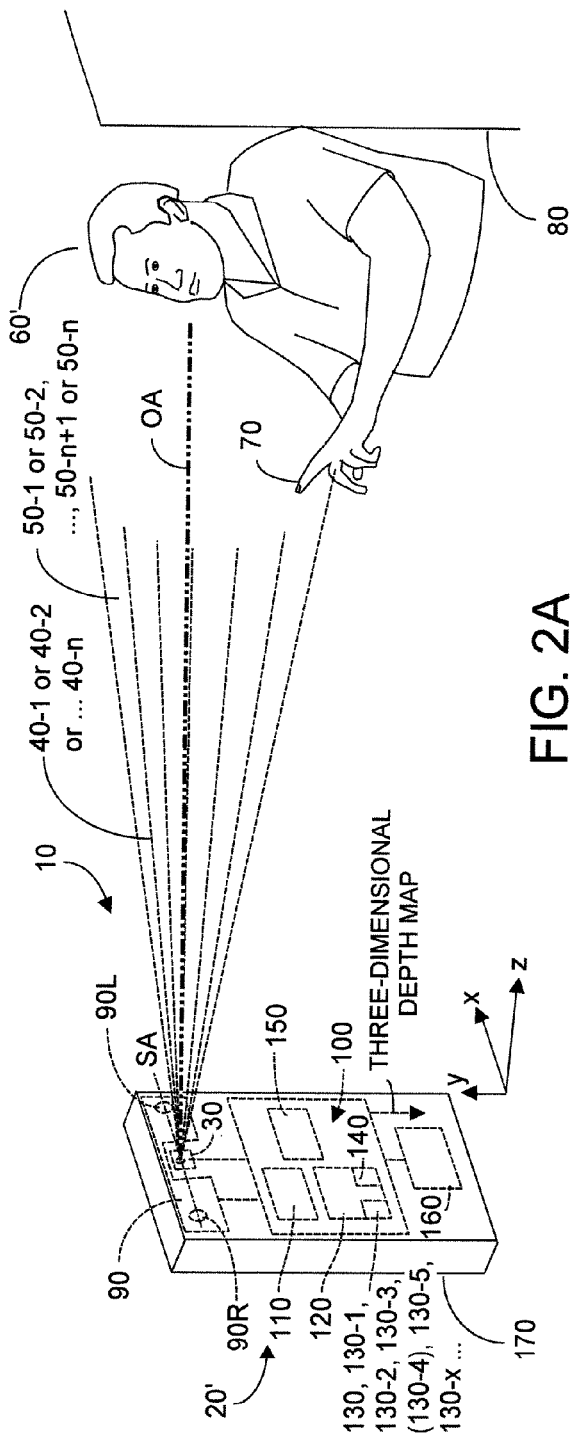
FIG. 2A depicts a spatially dynamically reconfigurable optical pattern generator (SRPG) module used with a system to rapidly reconstruct three-dimensional (x,y,z) image data of target objects, which data is useful in rapidly recognizing gestures made by human target objects, according to embodiments of the present invention.

FIG. 1A depicts a system 10, which according to embodiments of the present invention preferably is handholdable by a user 15 (drawn in phantom to avoid cluttering the figure) and includes a portable preferably battery powered device 20 that houses a pattern projection system 30 that includes a light source and a spatially reconfigurable pattern generator (SRPG). Pattern projection system 30 projects an optical field 40 including at least one pattern e.g., 50-1 or 50-2 or 50-3 . . . 50-n onto a scene shown here as including a first target object 60 (a stuffed teddy bear toy) having a rotational axis denoted RA, and background imagery 80, here a planar wall. An optical axis OA is defined by system 30. Also housed within device 20 is an optical acquisition system 90, shown here as including first and second two-dimensional cameras 90L and 90R, preferably disposed on a common x-axis with output optical energy emitted from projection system 30. Cameras 90L and 90R may have RGB color sensors, IR sensors, black/white sensors, and the two cameras 90L, 90R need not be identical to each other. Preferably cameras 90L, 90R are symmetrically disposed relative to the point of emanations of optical energy from pattern projection system 30, as indicated by symmetrical axis SA. Note too that the z-distance range between device 20 and imageable target object(s) 60, 80 is far greater than the distance between pattern projection system 30 and optical acquisition system 90.

Device 20 preferably also houses a processing system 100 that preferably includes at least one processor 110, memory 120 storing at least pattern generation instructions 130, a lookup table 130-1 of stored projectable patterns and associated $\Delta z$ distances to command each pattern, at least one inference algorithm 130-2 to intelligently select stored patterns for projection based upon current optically acquired data to optimized generation of a three-dimensional depth map, a feedback optimization algorithm 130-3 to dynamically improve quality of imaged projected patterns, a scanning routine 130-4, a three-dimensional reconstruction algorithm 140 to generate a three-dimensional depth map of what was imaged by optical acquisition system 90, and an input/output (I/O) interface 150 that preferably can couple closed-loop feedback information from optical acquisition system 90 to processor system 100 and pattern projection system 30, e.g., to dynamically optimized pattern generation according to the nature of the scene being imaged at the moment. Device 20 preferably further houses an internal power supply, e.g., a battery 160. Processing system 100 is coupled to communicate bilaterally with both projection system 30 and optical acquisition system 90.

In some embodiments device 20 may include a display 170, disposed here on the rear side of the device, that can depict imagery acquired by optical acquisition system 90, and/or such imagery after processing by processor system 100. In other embodiments such pre- and/or post-processing imagery may be ported, wirelessly or otherwise, to an external display 170'. In practice embodiments of system 10 can acquire and use optical information obtained from target objects over a z-range as close as about z=5 cm to as far as about z=15 m. Note that the distance between cameras 90R, 90L and pattern projection system 30 is small relative to the z-distance between system 30 and imaged target objects, e.g., 60, 70, 80. As such it is understood that FIG. 1A and the other figures herein are not drawn to scale.

Three-dimensional reconstruction by processor system 100 of optical information acquired by optical acquisition system 90 in FIG. 1A calculates estimates of z-distance from the surface of target object(s), e.g., 60 to pattern projection system 30 based upon disparity of the target object(s) acquired by camera 90L and by camera 90R. Essentially the same acquired target object is compared in image data frames acquired from each camera 90L, 90R and disparity in the two frames is examined. The embodiment of FIG. 1A preferably is used to scan target object 60. User 15 may move device 20 relative to the target object, acquiring images through a scan angle φ. Indeed user 15 may literally move device 20 through a scan angle φ of 360°, going completely around target object 60. If desired, device 20 could of course be mounted on a mechanical arm that pivots about axis RA associated with target object 60, pivoting perhaps a full 360°. Alternatively device 20 may be stationary (indeed need not even be hand holdable in size) and target object 60 may be rotated about a rotation axis RA, perhaps rotated through an angle θ of 360°, while device 20 acquires imagery.

In either embodiment optical acquisition system 90 can acquire many images of different aspects of the target object, i.e., perhaps full frontal view, segueing into a frontal-left view, segueing into a left view, etc. In some applications it may be desired that device 20 scan and acquire imagery of target object 60 perhaps over a full 360° range that encompasses the full perimeter of the target object. Such full image scanning enables the three-dimensional (x,y,z) depth map data output from device 20 to be acquired for the full surface of target object 60. The (x,y,z) depth map data may be used, without limitation, as input perhaps to a three-dimensional lathe or three-dimensional printer, to create a model of target object 60, which model may be scaled up or down relative to the actual size of the scanned target object.

The use of projected patterns can facilitate acquisition of good (x,y,z) data. Patterns, e.g., 50-1, 50-2 emitted by pattern projector system 30 and falling upon and being reflected by target object 60, 80 for acquisition by cameras 90L, 90R provide additional parallax information that can improve the speed and accuracy of the three-dimensional reconstruction process by processor system 100. Each camera 90L, 90R acquires optical imagery from its own vantage point of the target object and patterns projected thereon, and the acquired imagery will include disparity information than can facilitate three-dimensional data reconstruction. Essentially the different projected patterns can convey different and complementary information based upon the imaged scene acquired by cameras 90L, 90R, Typically optical acquisition system 90 acquires optical images at a sufficiently rapid frame rate, e.g., 60 frames/sec., such that rapid three-dimensional data reconstruction by processor system 100 can be achieved, even if in applications (see FIG. 2A) the imaged scene includes target object(s) that are moving rapidly. Projected patterns can be changed substantially more rapidly than the frame rate of acquisition of optical data by cameras 90L, 90R, typically about 16.7 ms.

FIG. 1B and FIG. 1C depict conceptually how use of different patterns, e.g., 50-1, 50-2, projected by system 30 can provide discernable clues including disparity information within the acquired imagery to processor system 100 as to the nature and location of target objects, e.g., 60, 80. System 10 may include a built-in display 170, or may export video wirelessly or otherwise to an external display 170'.

FIG. 1B and FIG. 1C depict a display 170', whereon is shown the imagery captured by optical acquisition system 90. As such display 170' (as well as display 170) shows the teddy bear object as viewed from different perspectives acquired by system 10. Patterns including first pattern 50-1, and second pattern 50-2, preferably are projected by system 30 in the near IR range so as not to be visible to the human eye. However, for ease of understanding exemplary patterns are shown in FIG. 1B and FIG. 1C as though they were visible to the human eye. In FIG. 1B, pattern 50-1 is shown as a grid of spots, some of which will contribute different disparity information when falling on portions of the imagery more distant from system 30, e.g., dots projected on wall 80, as contrasted to projected dots falling on near surface regions of the teddy bear target object 60. In FIG. 1C a completely different pattern 50-2 has been projected by system 30, here a pattern of lines of various lengths and orientations. In some instances these lines falling upon curved target objects, e.g., head 60, hand 70 may contribute different disparity information pattern lines falling upon a planar surface, e.g., wall 80.

The patterns shown in FIGS. 1B and 1C are intended to show only that projection of differing first and second patterns enables system 30 to optically acquire parallax and other optical information including disparity information. The thus augmented optical information enables processor system 100 to more rapidly arrive at a more accurate three-dimensional reconstruction image of what is being imaged than if no patterns were used, or only one pattern was used.

As shown in FIGS. 1A-1C, patterns 50-1, 50-2, . . . 50-n optically output from pattern projection system 30 preferably fall upon at least one target object, e.g., 60, 80 in the imaged scene, e.g., the scene imageable by both cameras 90L, 90R within optical acquisition system 90. Generally the imageable scene will fall within the intersection of the field of view (FOV) of the cameras 90L, 90R. Cameras 90L, 90R each include a sensor array of detection pixels enabling optical acquisition system 90 to sense and detect light, ambient or otherwise, reflected by the various target objects in the imaged scene, as well as typically near-IR light reflected from the patterns falling upon the imaged scene.

Consider some exemplary, but certainly not exhaustive, pattern design considerations useful to more discern different qualities and characteristics of target objects in an imaged scene, to hasten three-dimensional reconstruction by processor system 100. In some embodiments pattern generator system 30 may be dynamically optimized to enhance spatial dynamic range, e.g., one pattern, perhaps 50-1, is optimized for target objects, perhaps 60, that are relatively close to system 10, while a second pattern, perhaps 50-2, is optimized for objects that are further away, perhaps wall 80. Such spatial optimization means pattern projection system 30 projects patterns useable by processor system 100 to more rapidly and more accurately assess a three-dimensional depth map (z-map) of the imagery captured by optical acquisition system 90, using disparity and other acquired information, than with other projectable pattern selections. In some application it might be desirable that pattern projection system 30 projects patterns optimized for geometric object recognition, e.g., perhaps pattern 50-3 is optimized for non-planar surfaces, e.g., target objects 60, while another pattern 50-4 is optimized for planar surfaces, e.g., wall 80. For example, assume patterns of dots were projected by pattern projector system 30. Pattern 50-3 might be a dense pattern of small dots of optical energy to improve resolution and edge quality of information acquired by optical acquisition system 90. In other applications, pattern 50-4 might be a less dense pattern of larger dots to ensure a smoother and more accurate estimation of the object plane, including acquiring information to assess planes at a larger slant angle.

As used herein, the term slant angle refers to an angle defined between the plane of the sensor array within each camera 90L, 90R and the plane of a particular target object, where optic axis OA in FIG. 1A, FIG. 2A is normal to each sensor array plane. For example in FIG. 1A the plane of wall target object 80 is essentially parallel to the sensor array plane in camera 90L or 90R, in which case the slant angle is zero. Stated differently, the plane of wall target 80 is substantially perpendicular to OA, as is the sensor array plane in camera 90L or camera 90R. The ability to acquire good image data through use of intelligently selected and projected patterns can increase the useable slant angle over which system 10 is useable.

In yet other applications, pattern projection system 30 might be optimized for temporal-spatial resolution. One pattern, e.g., pattern 50-n might have a high density locally unique pattern optimized for use with dynamic scenes, e.g., perhaps target objects 60 that are moving or being moved rapidly relative to a typical 30 frame/sec acquisition capture rate commonly used with optical acquisition system 90. Another pattern 50-n+1 might be a lower density locally unique pattern optimized for relatively stationary objects, e.g., target object 80. Such pattern choices here can improve the quality and speed of a segmentation algorithm useable by processor system 100 to generate three-dimensional reconstruction data.

FIG. 2A is similar to what was described with respect to FIG. 1A except that the device, denoted as 20', now includes additional gesture recognition software 130-5 to carryout gesture recognition. Optionally, memory in device 20' may also include scanning software 130-4. Gestures are made by the target object, e.g., human 60' or a portion of the target object, e.g., hand 70, and are acquired by optical acquisition system 90 in device 20'. Whereas the embodiment of FIG. 1A was directed primarily to scanning a passive target object 60, the embodiment of FIG. 2A is directed primarily to acquiring and recognizing (e.g., interpreting) gestures made by a typically human target object, 60', 70. Reference numerals in FIG. 2A and indeed the following figures that are the same as reference numerals in FIG. 1A may be assumed to reference the same thing.

Note that device 20' in FIG. 2A also includes pattern projection system 30, which again includes a light source and a spatially reconfigurable pattern generator (SRPG). In the manner described earlier, pattern projection system 30 projects at least one pattern e.g., 50-1 or 50-2 or 50-3 . . . 50-n onto the imaged scene shown here as including a first target object 60' (a human face), a second target object 70 (a gesturing hand, perhaps a thumbs up gesture or a "V" for victory gesture to signify agreement, perhaps a thumbs down gesture to signify disagreement), and background imagery 80, here a planar wall. As before, device 20' houses optical acquisition system 90, which includes spaced-apart first and second two-dimensional cameras 90L and 90R, preferably disposed on a common x-axis with output optical energy emitted from projection system 30. As before, the z-distance range between device 20' and imageable target object(s) 60', 70, 80 is far greater than the distance between pattern projection system 30 and optical acquisition system 90.

Device 20' preferably also houses a processing system 100 having at least one processor 110, memory 120 storing at least pattern generation instructions 130, a lookup table 130-1 of stored projectable patterns and associated Δz distances to command each pattern, at least one inference algorithm 130-2 to intelligently select stored patterns for projection based upon current optically acquired data to optimized generation of a three-depth map, a feedback optimization algorithm 130-3 to dynamically improve quality of imaged projected patterns, a gesture recognition algorithm 130-5, a three-dimensional reconstruction algorithm 140 to generate a three-dimensional depth map of what was imaged by optical acquisition system 90, and an input/output (I/O) interface 150 that preferably can couple closed-loop feedback information from optical acquisition system 90 to processor system 100 and pattern projection system 30, e.g., to dynamically optimized pattern generation according to the nature of the scene being imaged at the moment.

Optionally, executable software within device 20' could include scanning software 130-5, as shown in FIG. 1A. In some embodiments device 20' may include a display 170, disposed here on the rear side of the device, that can depict imagery acquired by optical acquisition system 90, and/or such imagery after processing by processor system 100. In other embodiments such pre- and/or post-processing imagery may be ported, wirelessly or otherwise, to an external display 170'. In practice embodiments of system 10 can acquire and use optical information obtained from target objects over a z-range as close as about z=5 cm to as far as about z=15 m. Note that the distance between cameras 90R, 90L and pattern projection system 30 is small relative to the z-distance between system 30 and imaged target objects, e.g., 60, 70, 80. As such it is understood that FIG. 1A and the other figures herein are not drawn to scale. Thus, while device 20 is drawn larger than human head 60 for ease of illustration, in practice device 20 may be as small as a cell telephone.

As was described with respect to FIG. 1A, optical information acquired by optical acquisition system 90 is processed by processor system 100 to rapidly yield three-dimensional (x,y,z) reconstruction data. Estimates of z-distance from target object(s), e.g., 60', 70 to pattern projection system 30 preferably are calculated based upon disparity of the target object(s) acquired by camera 90L and by camera 90R. Essentially the same acquired target object is compared in image data frames acquired from each camera 90L, 90R and disparity in the two frames including disparity from imaged projected pattern(s) is examined. Patterns, e.g., 50-1, 50-2 emitted by pattern projector system 30 and falling upon and being reflected by target objects, e.g., 60', 70, 80 for acquisition by cameras 90L, 90R provide additional parallax information including clues that can improve the speed and accuracy of the three-dimensional reconstruction process by processor system 100. Typically-optical acquisition system 90 acquires optical images at a sufficiently rapid frame rate, e.g., 60 frames/sec., such that rapid three-dimensional data reconstruction by processor system 100 can be achieved, even if the imaged scene includes target object(s), e.g., 70, moving rapidly, e.g., as fast as a human hand or arm might move. Projected patterns can be changed substantially more rapidly than the frame rate of acquisition of optical data by cameras 90L, 90R, typically about 16.7 ms.

Figure 2C:
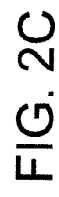
FIG. 2B and FIG. 2C depict first and second exemplary patterns projected from the optical pattern generator of FIG. 2A, projected upon target objects, as though such patterns were visible to the human eye, according to embodiments of the present invention.
Figure 2B:

FIG. 2B and FIG. 2C depict conceptually how use of different patterns, e.g., 50-1, 50-2, projected by system 30 in device 20' can provide discernable clues to processor system 100 as to the nature and location of target objects, e.g., 60', 70, 80. Device 20' may include a display 170 and/or may export acquired imagery to an external display 170' such as depicted in FIG. 2B and FIG. 2C. These figures show on display 170' (and 170) imagery captured by optical acquisition system 90, including the head 60' and hand 70 of the target object subject shown in FIG. 2A. As was the case with FIG. 1B and FIG. 1C, although projected patterns preferably are invisible to the human eye, FIG. 2B and FIG. 2C depict exemplary first and second patterns as though they were visible to the human eye. In FIG. 2B, pattern 50-1 is shown as a grid of spots, some of which appear larger when falling on portions of the imagery more distant from system 30, e.g., dots projected on wall 80, as contrasted to projected dots falling on target object head 60', or hand 70. In FIG. 2C a completely different pattern 50-2 has been projected by system 30, here a pattern of lines of various lengths and orientations. In some instances these lines falling upon curved target objects, e.g., head 60', hand 70 may be distorted whereas pattern lines falling upon a planar surface, e.g., wall 80 are not necessarily distorted.

The patterns shown in FIGS. 2B and 2C are intended to show only that projection of differing first and second patterns enables system 30 to optically acquire parallax and other optical information including disparity information. The thus augmented optical information enables processor system 100 to more rapidly arrive at a more accurate three-dimensional reconstruction image of what is being imaged than if no patterns were used or only one pattern was used.

As shown in FIG. 2A, FIG. 2B, and FIG. 2C patterns 50-1, 50-2, . . . 50-n optically output from pattern projection system 30 preferably fall upon at least one portion of a target object, e.g., 60', 70, 80 in the imaged scene, e.g., the scene imageable by both cameras 90L, 90R within optical acquisition system 80. As described, the imageable scene will fall within the intersection of the field of view (FOV) of the cameras 90L, 90R.

Consider some exemplary, but certainly not exhaustive, pattern design considerations useful to more discern different qualities and characteristics of target objects in an imaged scene, to hasten three-dimensional reconstruction by processor system 100. In some embodiments pattern generator system 30 may be dynamically optimized to enhance spatial dynamic range, e.g., one pattern, perhaps 50-1, is optimized for target objects, perhaps 60', 70, that are relatively close to system 10, while a second pattern, perhaps 50-2, is optimized for objects that are further away, perhaps wall 80. Such spatial optimization means pattern projection system 30 projects patterns whose disparity contributions are useable by processor system 100 to more rapidly and more accurately assess a three-dimensional depth map (z-map) of the imagery captured by optical acquisition system 90, than with other pattern selections.

On the other hand it might be desirable that pattern projection system 30 projects patterns whose disparity contributions are optimized for geometric object recognition, e.g., perhaps pattern 50-3 is optimized for non-planar surfaces, e.g., target objects 60', 70, while another pattern 50-4 is optimized for planar surfaces, e.g., wall 80. For example, assume patterns of dots were projected by pattern projector system 30. Pattern 50-3 might be a dense pattern of small dots of optical energy whose disparity contribution can improve resolution and edge quality of information acquired by optical acquisition system 90. On the other hand, pattern 50-4 might be a less dense pattern of larger dots whose disparity contribution can ensure a smoother and more accurate estimation of the object plane, including acquiring information to assess planes at a larger slant angle relative the optical axis of the optical acquisition system 90. In another application pattern projection system 30 might be optimized for temporal-spatial resolution. One pattern, e.g., pattern 50-n might have a high density locally unique pattern whose disparity contribution is optimized for use with dynamic scenes, e.g., perhaps target objects 60' and 70 are moving rapidly relative to a typical 30 frame/sec acquisition capture rate commonly used with optical acquisition system 90, while pattern 50-n+1 might be a lower density locally unique pattern optimized for relatively stationary objects, e.g., wall target object 80. Such pattern choices here can improve the quality and speed of a segmentation algorithm useable by processor system 100 to generate three-dimensional reconstruction data.

Two-dimensional imaging systems similar to what is shown in FIGS. 1A and 2A, but without projectable pattern generation, have been developed by Imimtek, Inc., now Aquifi, Inc. of Palo Alto, Calif., and are described in US patents including U.S. Pat. No. 8,723,789, U.S. Pat. No. 8,840,466, U.S. Pat. No. 8,686,943, U.S. Pat. No. 8,773,512, U.S. Pat. No. 8,854,433, and U.S. Pat. No. 8,836,768. These patents describe in far more detail than need be set forth here useful methods and systems to acquire two-dimensional data, especially from user gestures including natural user gestures. Applicants herein refer to and incorporate by reference herein the disclosure of these said US patents for their descriptions of acquiring and processing three-dimensional (x,y,z) depth data.

Turning now to FIG. 3A and FIG. 3B an exemplary pattern projector system 30 is described, which is applicable to both the scanning embodiment of FIG. 1A and the gesture recognition system of FIG. 2A. Pattern projector system 30 includes a light source with collimation optics, collectively 300, which outputs collimated optical energy 310, preferably in a spectral region preferably not visible to the human eye. Depending upon the requirements of system 10, optical energy 310 output from light source 300 may be coherent or at least substantially coherent, at least semi-coherent, visible, or infra-red (IR), and light source 300 may be a laser diode. Energy 310 from source 300 is input to spatially reconfigurable pattern generator (SRPG) 320. SRPG 320 processes incoming optical energy 310 and outputs either first optical wavefront 40-1 that projects a first pattern, e.g., 50-1, or outputs second optical wavefront 40-2 that projects a second pattern, e.g., 50-2. These projected patterns are directed towards the scene to be imaged. Of course more than two different projectable light patterns may be created, and thus wavefront 40-x will generate pattern 50-x, and wavefront 40-x+1 will generate pattern 50-x+1, and so forth.

In FIG. 3A and FIG. 3B, SRPG 320 includes DOE 350, DOE 360, and actuator mechanisms 380A, 380B and optional embedded actuator controllers 390A, 390G, associated with DOE 370. FIG. 3A and FIG. 3B are similar in that light source 300 outputs collimated optical energy 310 that is input to a first DOE 350 that processes energy 310 and outputs optical wavefront 360. It is not required that wavefront 360 if extended to the far field (or Fraunhofen region) of DOE 350 have a recognizable projectable light pattern. Second DOE 370 is disposed within the near field of first DOE 350 and the projectable pattern output from DOE 370 will fall upon target object(s) within the far field (Fraunhofen region) of DOE 370.

Output wavefront 360 from first DOE 350 is optimized such that second DOE 370 will output wavefronts 40-1, 40-2 that have desired far field projectable structured or coded light patterns, respectively 50-1, 50-2. In FIG. 3A, second DOE 370 is shown spaced-apart in a downstream direction from first DOE 350 a distance equal to $\Delta_{z2}$ (z2−z1). However in FIG. 3B, second DOE 370 is shown spaced-apart downstream from first DOE 350 a different distance $\Delta_{z3}=(z3-z1)$. In each instance the maximum spaced-apart distance $\Delta_{z2}$ or $\Delta_{z3}$ will be within the so-called near field or Fresnel region of the upstream DOE 350. Depending upon wavelength (λ) emitted by light source 300 and the design of DOE 350, the near field of DOE 350 may be as small as 10-100 μm to as large as perhaps 5 mm. In FIG. 3A and FIG. 3B, optical axis OA is shown normal to the plane of DOE 350 and DOE 370. DOE 350 and DOE 360 are passive elements designed and fabricated to implement a particular immutable optical transfer function.

In FIG. 3A and FIG. 3B electro-mechanical actuators 380A, 380B electronically and mechanically controllably reposition second DOE 370 a desired distance Δz downstream from but within the near field of first DOE 350. Such repositioning controllably alters effective optical length of the optical path between first DOE 350 and second DOE 370, resulting in generation of at least first and second projectable patterns. In embodiments of the preferred invention, actuators 380A, 380B may include embedded controllers 390A, 390B that are coupled to processor system 100, to govern the spaced-apart distance $\Delta_z$. As used herein, first DOE 350 is optically downstream from light source 300, and second DOE 370 is downstream from first DOE 350. Actuators 380A, 380 and optional embedded controllers 390A, 390B under command of processor system dynamically reconfigure pattern generator 320 by altering magnitude of $\Delta_z$. In one configuration mode or state spatial reconfigurable pattern generator (SRPG) 320 generates a first pattern of structured or coded light, e.g., 50-1, and in a second state SRPG 320 generates a second pattern of structured or coded light, e.g., 50-2. These patterns are created in the far field of second DOE 370. In practice, a finite set of independent projectable structured or coded patterns of light is produced in the far field of second DOE 370 as a function of magnitude of Δz. The images projected will fall upon target object(s), e.g., 60, 80 in FIG. 1A, 60', 70, 80 in FIG. 2A, within the far field of second DOE 370.

In FIG. 3A and FIG. 3B, actuators 380A, 380B are implementable using various technologies such as and without limitation piezoelectric actuation units, linear voice coil motor actuation units, and MEMs (mechanical-electro-mechanical systems) actuation units. Exemplary actuators are commercially available from vendors such as New Scale Technologies, Inc. of Victor, NY (e.g., piezoelectric actuator models M3-FS, M3-F), AAC Technologies Holdings, Inc. of Changzhou, PRC (voltage coil motor actuator models 8552A, 8546A, and Invensas Corp. of San Jose, Calif. (MEMs actuators). In the case of MEMs actuation, DOE 370 and MEMs 380A, 380B may be integrated during fabrication onto a single semiconductor, to improve tolerance margins, and to lower manufacturing cost.

In practice magnitude of Δz is a design parameter and exemplary magnitudes of Δz may be in the range of about 20 μm to about 500 μm for a compact form factor near-IR laser diode light source 300. For example a particular embodiment that projects two light patterns might store in lookup table 130-1 Δz2=100 μm to command projection of first light pattern 50-1, and might store Δz3=200 μm to command projection of second light pattern 50-2. The Δz values stored in the lookup table are system design parameters. Sensitivity or Δz value tolerance of overall system 10 (see FIG. 1A) in repositioning DOE 370 relative to DOE depends on factors including optical wavelength output by light source 300, and optical system projection angle. As used herein, the term projection angle refers to the largest angle created by the illumination field created by the pattern generator. In practice tolerance in Δz of about 1 μm to perhaps 10 μm will still enable system 10 to maintain an adequately high quality of projected patterns, e.g., 50-1 or 50-2.

In some preferred embodiments, closed-loop fine control over actuators 380A, 380B enables the images captured by optical acquisition system 90 to more precisely reposition DOE 370 to better focus the projected pattern in the imaged scene. DOE 350 and DOE 370 preferably are designed by a computer algorithm that takes into account the various possible spatial configurations of DOE 370 relative to DOE 350, as well as the desired output patterns 50-1, 50-2. DOE design also will include constraints such as DOE module size, optics, manufacturability, and three-dimensional depth map reconstruction. The computer algorithm used for the DOE design may use a global optimization scheme or an iterative refinement scheme.

Figures 3C, 3D:
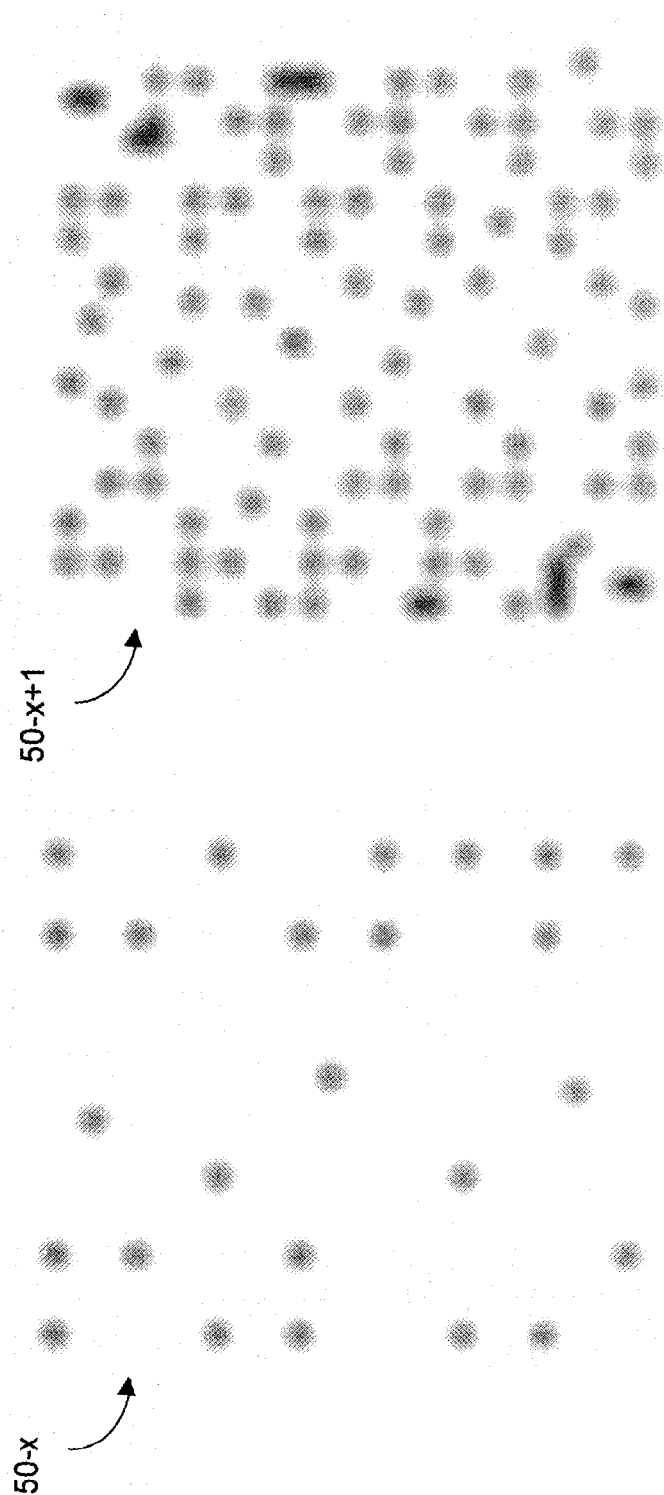
FIG. 3C and FIG. 3D are simulations, showing the change in projectable first and second patterns resulting from $\Delta_z$ of a few tens of μm for the configurations of FIGS. 3A and 3B, according to embodiments of the present invention.

Exemplary computer simulated projectable patterns output from an SRPG 320 are shown in FIG. 3C and FIG. 3D, where $\Delta_z$ is on the order of a few tens of microns. What is shown in FIG. 3C and FIG. 3D is actually a negative image (dark for light), for ease of illustration and was output from a simulation of SRPG 320. It will be appreciated from examining FIG. 3C and FIG. 3D that there is a substantial change in the projectable patterns, resulting from changing the distance $\Delta_z$ between first DOE 350 and second DOE 370. As described such dynamic reconfiguration arises by processor system 100 appropriately commanding actuators 380A, 380B and any associated embedded controllers 390A, 390B (see FIG. 3A and FIG. 3B) to reposition second DOE 370 the desired amount $\Delta_z$. In practice granularity or fineness of increments in $\Delta_z$ may be in the 1 μm to perhaps 10 μm range.

As described, the SRPG embodiments exemplified by FIG. 3A and FIG. 3B electronically albeit mechanically alter effective optical length between the first and second DOEs comprising the SRPG, thus generating at least first and second projectable patterns. By contrast, the embodiments exemplified by FIG. 4A and FIG. 4B electronically alter effective optical length between first and second DOEs, but do so with no moving parts by including a liquid crystal spatial light modulator sandwiched between the two DOEs.

The block diagram of FIG. 4A and FIG. 4B includes light source 300 whose output collimated optical energy 310 is input to first DOE 350. Spaced apart but within the near field of first DOE 350 is second DOE 370. However unlike the configuration of FIG. 3A and FIG. 3B, rather than having an air between the two DOEs, the two DOEs sandwich a liquid crystal (LC) spatial light modulator (SLM) 400, or LC-SLM, whose internal pixel characteristics are electronically controllable by SLM controller 410, which may be an embedded controller. Controller 410 responds to electronic control signals, e.g., $f(t_1)$, $f(t_2)$ obtained from the overall system processor 110 (see FIG. 1A, FIG. 2A, FIG. 6). Note in FIG. 4A and FIG. 4B that the spaced-apart distance $\Delta z_3$ remains the same, which is to say both DOEs are stationary with respect to each other. However electronically LC-SLM 400 alters effective optical length between the two DOEs to be less than or equal to the spaced-apart distance $\Delta z_3$. A look-up table similar to 130-1 stored in memory 120 (see FIG. 1A, FIG. 2A, FIG. 6) can store different f(t) functions representing different effective optical length distances, to command different projectable output patterns from pattern projection system 30. Thus in FIG. 4A, processor 110 sends an electronic control signal $f(t_1)$ to controller 410, causing SLM 400 to controllably alter effective optical length between the two DOEs such that projectable first patterns 50-1, 50-x are generated. However in FIG. 4B, processor 110 sends a different control signal f($t_2$) to controller 410, which causes SLM 400 to electronically alter its internal pixel characteristics, with the result that projectable second patterns 50-2, 50-$x$+1 are now generated.

While the embodiments of FIGS. 4A and 4B have no moving parts, in contrast to the embodiments of FIGS. 3A and 3B, optical efficiency suffers in that rather than traverse air in travelling between the two DOEs, optical energy from source 300 must traverse LC-SLM 400. Associated with LC-SLM 400 will be a non-zero imaginary component of the refractive index, resulting in attenuation of the optical energy compared to nearly lossless propagation through air at such short distances. Additionally, there will likely be some loss of sharpness and intensity in the projected patterns. Typically the thickness of the liquid crystal layer per se within LC-SLM 400 is perhaps <0.5 mm. Given that the index of refraction of this layer is >1, the spaced-apart fixed distance $\Delta z_3$ may be greater than for the non-SLM movable DOE embodiments such as shown in FIG. 3A and FIG. 3B. An exemplary transmissive mode LC-SLM 400 that might be used in embodiments such as shown in FIG. 4A and FIG. 4B is made by JENOPTIK Optical Systems GmbH, and is depicted at http://www.jenoptik.com/en-PLM-phase-modulator.

With reference to the embodiments of FIG. 3A, FIG. 3B, and FIG. 4A and FIG. 4B commercially available laser diodes useable as light source 300 have output wavelength (2) spectrums ranging from about 808 nm to about 980 nm, with spectra falling in the range of about 830 nm to about 850 nm being in the near-infrared (near IR) region preferred in that the pattern spectrum need not be visible to the human eye. However if projected patterns 50-$n$, 50-$n$+1 are to be visible to the human eye, light source 300 can be a laser diode having an output wavelength in the perhaps 400 nm to 690 nm region.

In practice light source 300 will be a laser diode whose average output optical power is in a range of about 1 mW to about 100 mW, depending upon the imaging requirements of system 10, including the z-range over which the system is to operate. Power efficiency of edge-emitting laser diode light source 100 is perhaps 40%, and electrical input power coupled to light source 300 will be commensurately larger. In some embodiments battery 110 power drain is intelligently conserved by processor system 100 dynamically controlling emitted power from light source 300 to use no more optical energy than required at the moment for good system 100 performance.

Figure 5:
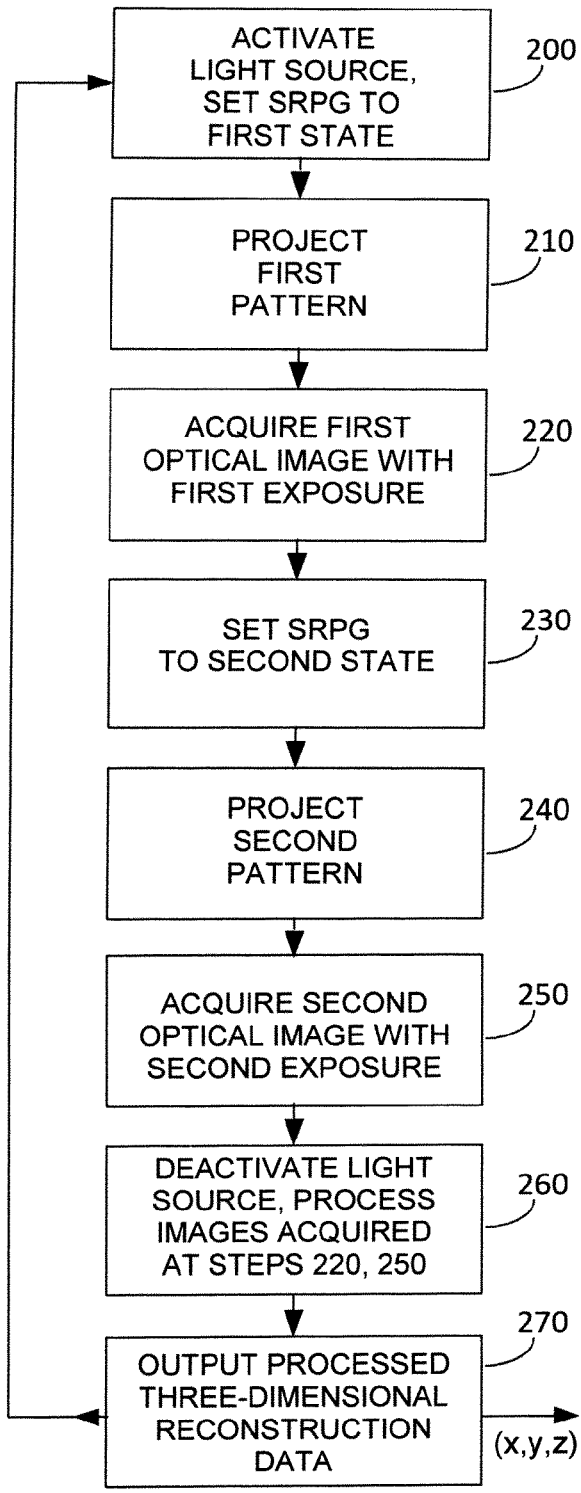
FIG. 5 is a flow diagram depicting exemplary steps associated with intelligently projecting first and second patterns and acquiring first and second images, according to embodiments of the present invention.

The above description of FIG. 3A, FIG. 3B, and FIG. 4 demonstrates how embodiments of the present invention can controllably generate different projectable patterns. FIG. 5 is a block diagram depicting the user of at least first and second projectable patterns by device 10 and device 10', as shown respectively in FIG. 1A and FIG. 2A.

In FIG. 5, at step 200, under control of processor system 100, light source 300 within pattern generator 30 is activated and SRPG 320 is set in a first state or mode by commanding a first magnitude of $\Delta_z$, and at step 210 a first pattern, e.g., 50-1, is projected by pattern generator 30 for a first time duration. With reference to FIG. 1A or FIG. 2A, projected patterns fall on the scene imaged by system 10 using device 20 or 20', which scene includes target object(s) such as 60, 80, 60/, 70. As noted the projected patterns will appear within the far field of second DOE 370, or within the far field of SLM 400.

At step 220, optical acquisition system 90 acquires a first image that will include the imaged scene as well as first pattern 50-1 projected upon the imaged scene. Processor system 100 preferably synchronously controls cameras 90L, 90R such that each camera shutter opens and closes substantially simultaneously to capture the imaged scene, which includes the projected pattern.

At step 230 processor system 100 causes the SRPG to be set in a second state or mode, e.g., by causing a different magnitude of $\Delta z$ to occur, and at step 240 a second pattern, e.g., 50-2, is projected by pattern generator for a second time duration that may but need not be the same as the first time generation.

At step 250 optical acquisition system 90 acquires a second image that will include the imaged scene as well as the second pattern 50-2 projected upon the imaged scene. As before processor system 100 preferably synchronously controls cameras 90L, 90R such that each camera shutter opens and closes substantially simultaneously to capture the imaged scene, which includes the projected pattern.

At step 260, processor system 100 causes light source 300 to be deactivated, and the images acquired at steps 220 and 250 are analyzed. Depending upon the embodiment of the present invention, within processor system 100, inference algorithm 130-2 perhaps in cooperation with lookup table 130-1 makes a best guess at a possibly more suitable pattern or pattern pair upon examination of the acquired imagery, and at step 270 processed three-dimensional reconstruction map data based upon the presently used pattern pair is output. Step 270 feeds back to step 200 and the procedure is repeated, but this time using at least one different pattern if inference algorithm 130-2 determined a different pattern might be more appropriate for what is presently being imaged. At method step 270 the processed three-dimensional (x,y,z) reconstruction data, i.e., depth map, is available for output.

The first and second exposure times used at steps 220 and 250 typically will be equal and will combine to define the frame rate period. For example, if the frame rate period is 16.7 ms, the first and second exposure times will be on the order of 8.3 ms each. In the case of a moving target object, e.g., hand 70, intelligent selection by software 130, 130-1, 130-2, 130-3 of a pattern appropriate to such target object enables system 100 to more rapidly output a high quality three-dimensional reconstruction data or depth map. Similarly if the target object has perhaps an unusual contour or perhaps surface characteristic, again intelligent selection by software 130, 130-1, 130-2, 130-3 of an pattern appropriate to such target object enables system 100 to more rapidly output a high quality three-dimensional reconstruction data or depth map.

The earlier referenced Imimtek-Aquifi U.S. further describes use of epipolar geometry and epipolar lines, and rectified system analysis to facilitate calculation of reconstructed three-dimensional (x,y,z) depth maps.

Let us now consider a practical embodiment to carry out the method steps described with respect to FIG. 5 with respect to dynamically outputting different projectable patterns.

Regardless of how they were generated, consider now how different types of projection patterns 50-1, 50-2, etc., emitted by pattern projection system 30 can assist processor system 100 in rapidly reconstruction three-dimensional data. In several embodiments under control of processor system 100, optical acquisition system 90 acquires frames of scene images in a bi-mode manner. A first two-dimensional image is acquired by projecting a first pattern, e.g., 50-1 (perhaps the pattern shown in FIG. 3C), then a two-dimensional image is acquired by projecting a second pattern, e.g., 50-2 (perhaps the pattern shown in FIG. 3D).

Referring to FIG. 1A and to FIG. 2A, three-dimensional reconstruction algorithm 140 produces a first and second coarse set of three-dimensional depth data for each mode of acquired optical imagery. Inference algorithm 130-2 makes a best guess as to what would be the best patterns for system 30 to project, given the image data acquired at the moment. Pattern generating software 130 and 130-1 cause a new best pattern, perhaps 50-3, 50-4 to be generated by SRPG 320 during the pattern generation modes, and software 140 computes new three-dimensional reconstruction data that will be more accurate than computed previously. This iterative approach is repeated over and over with the result that projected patterns 50-$x$ will be relatively optimized for the nature of target object(s), e.g., 60, 60', 70, 80 being imaged at the moment. Thus if a target object is rapidly moving, suitable patterns are projected to aid three-dimensional reconstruction by system 100. If relatively planar target objects are being imaged, a different set of suitable patterns will be projected, and so on. If desired, more than two patterns may be generated in a tri-mode operation by processor 100 commanding three different values of $\Delta z$. In this fashion the generation and projection of multiple patterns facilitates rapid and accurate three-dimensional reconstruction of scenery acquired by two-dimensional cameras.

The various patterns 50-$x$, 50-$x$+1 projected by system 30 may be designed relative to fabrication of DOE 350 and DOE 370 to be structured, coded, or randomized in projected appearance. Optical detection of target objects and scenes having relevant patterns projected thereon improves accuracy and confidence of reconstructed three-dimensional depth map estimation by processor system 100. Such three-dimensional reconstruction map data is exportable and may be used by system 10 and/or exported elsewhere. Without limitation, such data might, be used to alter imagery shown on a display such as 170 or 170' in a virtual game played by an individual being imaged, e.g., target object 60', 70.

Note that because processor system 100 knows what the acquired image of each projected pattern should look like, closed-loop feedback operation can make corrections needed to $\Delta z$ to compensate at least in part for parameter changes in overall system 10. For example if a projectable pattern is a perfectly symmetrical circle yet the imaged project pattern falling upon what appears to be a planar surface normal to optical axis OA is elongated, software among 130 may be invoked to make real-time closed loop feedback corrections in the response of system 10. Compensable parameter changes include manufacturing tolerances for DOE production and/or mechanical actuators, mechanical vibrations and/or temperature induced variations within, system 10 calibration or alignment errors, and human error in use of system 10, etc. Such closed-loop compensation may be carried out continuously by processor system 100, or may be commanded by a user of system 10 in a simple calibration procedure.

Scanning software routine 130-4 in FIG. 1A preferably uses successive frames of optical data acquired by cameras 90L and 90R, and attempts to match corresponding image features acquired by each camera. In addition, if device 20 includes an inertia type sensor, such sensor inertia output information may also be used in reconstructing a three-dimensional (x,y,z) model or map of the relevant features of the target object. Such techniques may include three-dimensional point cloud, or mesh information processing, and are known to those skilled in the relevant art. However embodiments of the present invention can substantially improve the geometric, noise, and speed qualities of the calculated desired three-dimensional reconstructed depth map information, e.g., (x,y,z) output from method step 270, FIG. 5.

Figure 6:
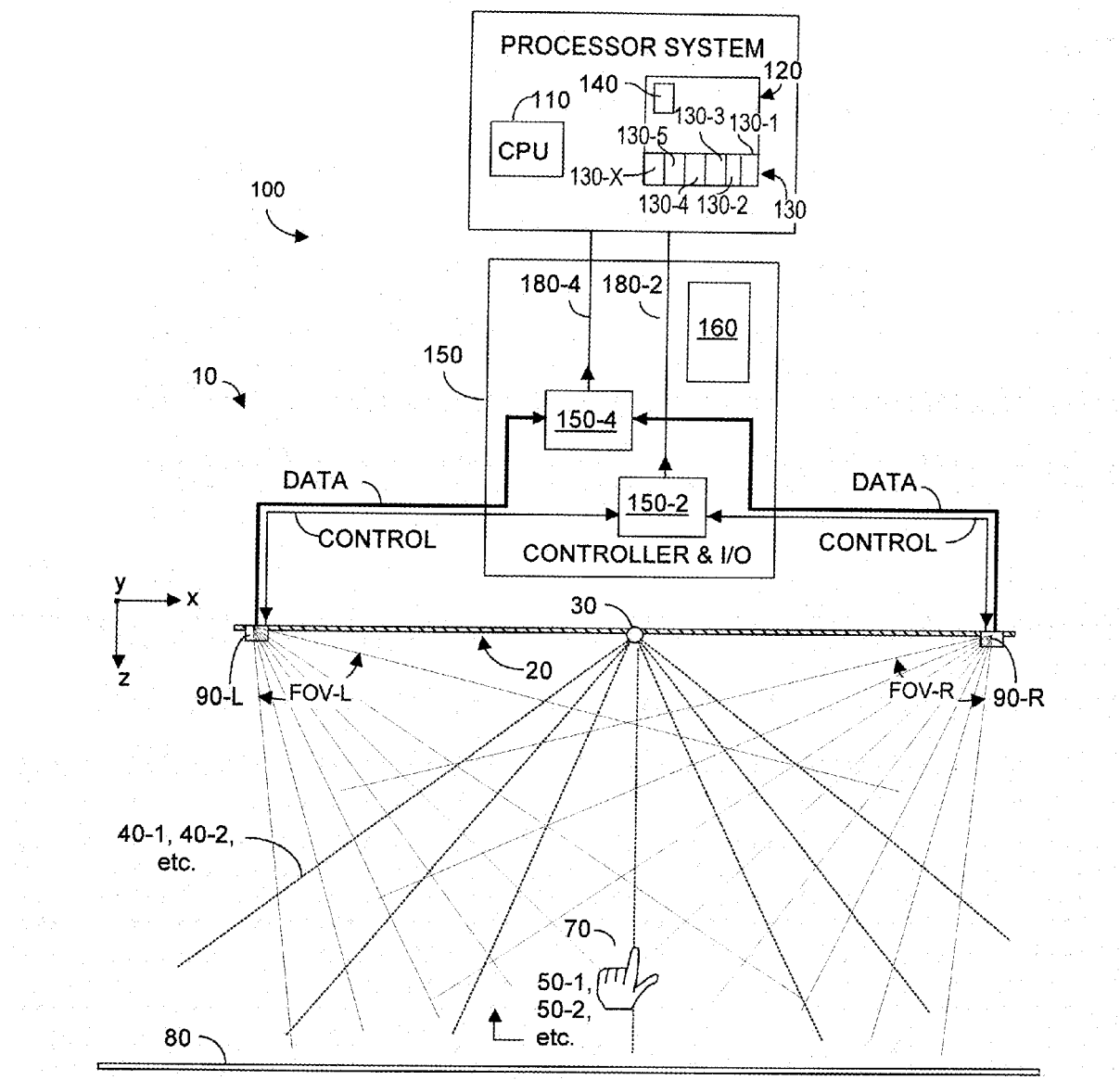
FIG. 6 depicts system 10, functionally and in terms of exemplary components, according to embodiments of the present invention.

FIG. 6 depicts components and functionality of overall system 10 and device 20 or device 20'. The lower portion of FIG. 6 depicts the physical' relationships between the field of view (FOV-R) of camera 90R, and the field of view (FOV-L) of camera 90L, and optical energy 40-1, 40-2 emanating from pattern projection system 30, preferably disposed symmetrically with respect to the two cameras. These fields of view are of course three-dimensional in shape and their intersection defines the frustum-shaped zone within which spaced-apart two-dimensional cameras 90R, 90L can image target objects, e.g., teddy bear 60, user head 60', user hand 70, within the three-dimensional imaged scene. According to embodiments of the present invention, what is imaged will also include projectable patterns such as 50-1, 50-1. Depending upon mode of system operation as governed by processor system 100, two different patterns may be projected and imaged along with any target object(s), e.g., 70 in the imaged scene, where first one pattern is projected, perhaps 50-1, then a second pattern is projected, perhaps 50-1. The projected patterns will appear within the far field of output DOE 370 for embodiments according to FIG. 3A or FIG. 3B, or within the far field of the single SLM embodiment of FIG. 4.

Preferably the two cameras are disposed symmetrically with respect to the point 30 of emanations 40-1, 40-2, etc. including projected light patterns, here 50-1, 50-2, which as noted appear in the far field of the second DOE within SRPG 320 in overall pattern projection system 30. Device 20 or device 20' has spaced-apart two-dimensional cameras 80-1, 80-2, preferably disposed symmetrically along an axis going through the output of projection system 30, e.g., the location from which optical energy 40-1, 40-2, including projected patterns 50-1, 50-2, etc. emanate. Rays in FIG. 6 that emanate from 90R, 90L show the respective optical fields of view FOV-1, FOV-2 for the two cameras, in (x,z) plane, where the y-axis is normal to the plane of FIG. 6. The FOV for each camera is of course three-dimensional in (x,y,z) space and defines a truncated frustum. In FIG. 6, within the overlapping three-dimensional FOVs of the two cameras is a hand target object 70, and each camera 90L, 90R captures an image of this and other target object(s) within the overlapping FOVs of the cameras. Not shown in FIG. 6 are the lens and image capture plane associated with each camera.

Captured image data (DATA) from each camera is read out at a frame rate commanded by processor 100 in device 20 or device 20' via control (CONTROL) lines, which lines are part of controller and I/O system 150. Within processor system 100, the three-dimensional reconstruction routine outputs a three-dimensional reconstruction map, which may be exported elsewhere if desired, typically through a communication protocol, e.g., MIPI, HDMI, USB, etc. Controller and I/O system 150 includes logic circuitry 150-1, 150-2 to govern flow of incoming optical image data via lines 156-1, 156-2, e.g., USB bus lines to device 20 processor system 100. Volatile memory flash memory 154 is provided and can preserve configuration data for each camera 90R, 90L, including calibration data that describes the geometric properties, i.e., intrinsic and extrinsic parameters, per camera.

It is useful at this juncture to consider design of at least one dynamically reconfigurable passive immutable DOE for use in protecting at least first and second patterns of light onto a scene to be imaged and processed for three-dimensional reconstruction, according to embodiments of the present invention. With reference to FIG. 3A and FIG. 3B, the spatial configuration of first DOE 350 and second DOE 370 is treated as a set of parameters in an optimization space. The optimum set of DOEs for a variety of spatial configurations e.g., different values of A is considered and a most optimum result is obtained, taking into account DOE manufacturing limitations and other constraints. Some design leeway is permissible in that spatial configuration of second DOE 370 relative to first DOE 350 is dynamically adjusted, e.g., adjusting to a desired $\Delta_z$, by system 10 at run-time, e.g., using actuators 380A, 380B, and possibly embedded controllers 390A, 390B, as decided by system 10 processor system 100 software algorithms, e.g., 130, 140, etc. There is no need to describe the design of an SLM such as 400 in FIG. 4 as SLMs are somewhat generic and may be interfaced at their input as though they were a display monitor. However rather than output a display image, their output can be equivalent to the energy from a DOE phase array.

According to embodiments of the present invention, the design method preferably generates M different projectable patterns using a fixed, purposefully engineered set T, and M sets $P_j$ to produce the different projections, e.g., 50-1, 50-2 in FIG. 3A and FIG. 3B.

At least one of the upstream and downstream facing surface of a DOE includes the micro-machined, molded, or otherwise formed geometric structure that results in the DOE transfer function. This structure includes micro-grooves and micro-steps that carry out the diffraction upon the incoming optical energy. The overall height of the micro geometric structure may be in the range of 10% to 200% of the wavelength of optical energy 300, perhaps an 800 nm wavelength. Within these limitations a thin film mathematical approximation may be used. Light source 300 outputs a light field 310 that is amplitude modulated and is processed by spatially reconfigurable pattern generator (SRPG) 320. Let SRPG 320 be described by a set of complex transfer functions in the real space T:

$$T = \{t_k(\xi,\zeta) = a_k(\xi,\zeta)\exp(i\phi_k(\xi,\zeta))\}_{k=1\ldots N}$$

where $a_k$ and $\phi_k$ describe amplitude modulation and relative phase delay imposed onto the input light field at a point $(\xi,\zeta)$ on the plane of the kth DOE respectively in SRPG 320.

If $a(\xi,\zeta)=a_0$ the relevant DOE is a phase-only type, where $a_0 \leq 1$ quantifies loss in the DOE. In practice, $\phi$ may not be a continuous function of $(\xi,\zeta)$. In a binary implementation embodiment of the present invention $\phi$ is quantized to two levels and is rasterized onto a grid that may but need not be uniform.

The description of N DOEs is completed by a set of $P_j$ vector pairs in real space $P_j = \{(\vec{r}_k, \vec{n}_k)\}_{k=1\ldots N}$, where $\vec{r}_k$ connects the origin of the reference frame, i.e., where light is output from source 300, to the center of the kth DOE, where $\vec{n}_k$ is the normal to the plane of the kth DOE. As noted, in FIG. 3A and FIG. 3B the plane of each DOE is normal to optical axis OA. Subscript j emphasizes that SRPG 320 will use at least j=1 ... M such sets. Embodiments of the present invention preferably generate M projection patterns using a fixed, purposefully engineered set T, and M sets $P_j$ to produce the different projection patterns, e.g., 50-x, 50-x+1.

Consider the transfer function of light for the kth DOE in SRPG 320, which transfer function may be represented as:

$$u_k^+(\xi,\zeta) = t_k(\xi,\zeta) \times u_k^-(\xi,\zeta)$$

where $u^-$ and $u^+$ denote the input and output complex light fields respectively for the kth DOE.

The light field propagation from the kth to the k+1st DOE is represented by the transformation:

$$u_{k+1}^- = \Im_{k,k+1}\{u_k^+\}$$

where $\Im_{k,k+1}$ is a propagation operator that depends on $\{(\vec{r}_k, \vec{n}_k),(\vec{r}_{k+1}, \vec{n}_{k+1})\}$, and models propagation of the diffracted light field through space. If an appropriate range for the parameters $(\vec{r}_k, \vec{n}_k)$ is made, the set $\{\Im_{k,k+1}\}_{k=1\ldots N-1}$ for every $P_j$ will define an independent transformation.

Consequently, embodiments of the present invention recognize that finding a fixed set T and finding M different sets $P_j$ may be reduced to a non-convex optimization analysis in which a set of constraints may be examined in three groups. A first group is projection plane constraints such as intensity and possibly phase of the projected patterns. A second group is DOE plane constraints such as quantization and rasterization of DOE transfer function phase. A third group is system module configuration constraints such as physical limits on the positions and orientations of the DOEs.

So-called projection plane constraints are essentially determined by desired output patterns of the system. As such, intensity constraints can be a set of patterns of dots (commonly known as a point cloud), or lines, or other shapes. Phase constraints may additionally be imposed to improve the uniformity of the projection pattern and reduce the speckle in regions where the pattern features overlap. As used above, quantization recognizes that optimization algorithms are generally designed to work on continuous variables. However due to manufacturing constraints, a DOE is fabricated with surface features having a quantized height, which quantized height essentially translates into quantization of variables such as intensity and phase.

Consequently, in practice optimization is carried out on continuous variables with gradually collapsing constraints, which effectively quantize the variables. As noted, a physical DOE is mathematically modeled using a transfer function that may be numerically represented by a matrix within a computer routine. A rasterization step is involved in translating from the transfer function to the matrix.

The present invention seeks to optimize creation of projectable desired patterns of light, with as little error as possible in the overall three-dimensional reconstruction carried out by processor system 100 (see FIG. 1A, FIG. 2A). Such error may be quantified in terms of at least one of criteria such as (a) mean square error in the achievable projectable pattern as compared to the design target projection pattern, (b) uniformity of the projectable pattern, (c) energy efficiency in producing the desired projectable pattern, and (d) ratio of desired signal/undesired noise on the output light from second DOE 370. In general, projectable patterns 50-1, etc. may be designed to enable optimal three-dimensional reconstructions by processor system 100 of arbitrary scenes, e.g., 60, 70, 80 when used individually, yet also are designed to work complementarily to provide optimal three-dimensional reconstruction when the various patterns are projected jointly, either simultaneously or in a spaced-apart in time sequence.

Figure 7:
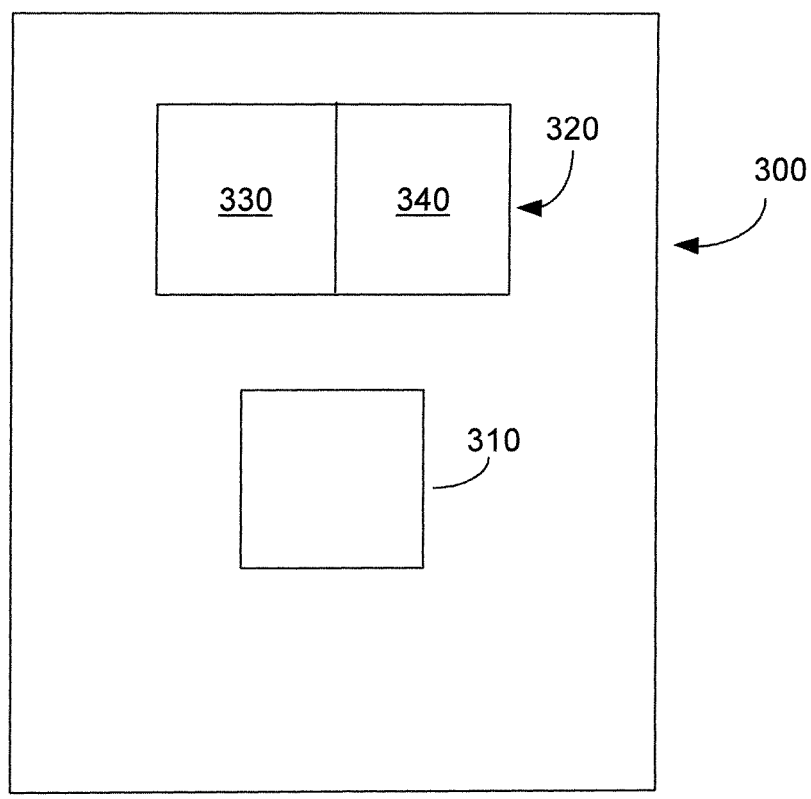
FIG. 7 depicts a prior art computer system useable to design a dynamically spatially reconfigurable pattern generator (SRPG) according to embodiments of the present invention.

Referring now to FIG. 7, the design method preferably is executed cn a standard computer system, e.g., computer system 500, shown as including a processor 510, and memory 520, storing at least two software algorithms 530, 540 executable by processor 510 to carry out the design method. According to embodiments of the present invention, at least one algorithm, e.g., 530, may be a standard global optimization algorithm employing simulated annealing, or an ad-hoc applied modified bidirectional iterative Fourier transform. In some embodiments of the present invention, the design method is carried out by computer system 500 executing stored software, e.g., 530, 540, to collectively exploit both standard and ad hoc optimization techniques, preferably augmented by potentially iteratively applied optimizations.

In practice, after computer system 500 completes optimization, set T is translated to a physical specification for design and fabrication of the DOE(s), using appropriate manufacturing models known in the art. Set P is used to program the embedded controller (not shown) associated with driving electro-mechanical actuator(s) 380A, 380B to physically manipulate downstream DOE 370 to a desired magnitude of $\Delta z$ at any given time.

In some embodiments closed-loop feedback software, e.g., 130-3 is used to help produce the desired projection patterns while compensating at least in part for system errors including mechanical misalignment between hardware components. In embodiments where mechanical actuators such as 380A, 380B can actuate in more than one degree of freedom, further system 10 characteristics may be exploited to produce other useful modifications in the output projection and/or active misalignment compensation. For example in FIG. 3A, FIG. 3B. two degrees of freedom of movement of second DOE 370 could be achieved by using additional actuator(s) such as 380A, 390B to enable effective tilting of optical axis OA exiting DOE 370 with respect to the optical axis associated with light source 300. Such tilting could enable better accommodation of larger slant angles, if desired.

Embodiments of the present invention can utilize DOEs 350, 370 whose design and transfer functions are substantially optimized to produce desired projectable patterns. Indeed, at least 90% pattern efficiency can be achieved, prior to DOE phase quantization for manufacturing. Pattern efficiency as used here is the ratio of the total energy of light delivered to the desired spots on the pattern, to the total energy of light available to dynamically reconfigurable pattern generator 320, disregarding losses attributable to manufacturing and material imperfections. In practice, overall design of SRPG 320 (FIG. 3A, FIG. 3B, FIG. 4A, FIG. 4B) will take into account factors including allowable size of the SRPG 320 module, SRPG cost, and power consumption constraints. At present, existing technologies cannot produce SLMs with the same optical efficiency and maximum projection angle (or FOV) as can be achieved with DOEs. Further, at present SLMs are more expensive to fabricate and physically larger than DOEs. However future changes in technology may make use of SLMs more competitive with DOEs.

Some other applications and observations with respect to embodiments of the present invention will now be described. Consider a structured light application in which the pattern generated by pattern projection system, e.g., 30 in FIG. 1A, FIG. 2A, FIG. 3A, FIG. 4A, FIG. 4B, is denoted P and the image acquired by the camera(s) is denoted as I. The projected pattern P is characterized by at least one wavelength $\lambda$ associated with light source 300. For ease of discussion, let only a single frequency laser light source be considered, although the below analysis will be applicable to light sources 300 that may output multiple wavelengths of optical energy.

Optical acquisition system 90 can be made to acquire only optical energy of the projected pattern wavelength using cameras, e.g., 90R, 90L whose sensors include a bandpass filter favoring the wavelength in question. Such filtering can enhance signal/noise in terms of processor system 100 yielding quality z-depth three-dimensional estimates.

In conventional structured-light depth estimation such as used in computer vision and depth sensing, two challenges arise. The first challenge involves correspondence computations and is the task of identifying the position in the image acquired by each camera of all the points in the projected pattern that are visible from the point of view of the camera itself. The second challenge is use of triangulation to obtain a depth estimate for each point in the projected pattern. Triangulation uses knowledge of the relative positions of the same points in the pattern as projected and in the images containing the pattern (and of course any target objects) as acquired by each camera. While triangulation may be performed optimally exploiting the parameters of system 10 that can be estimated during a calibration step, the problem of computing the correspondences between points in the projected pattern and in the images acquired by the cameras is complex. It will be appreciated that embodiments of the present invention that enable the projection of multiple patterns, e.g., 50-1, 50-1, etc. can help resolve the correspondences problem.

With benefit of multiple patterns, the correspondences computation problem can generally be treated as a coding problem, and for a structured light system can be considered as structured light-coding or simply a light-coding system. Within the coding framework the different illumination values that are contained in the projected pattern (e.g., black and white for a binary pattern) constitute the alphabet A of the symbols of the code. In the simplest case the alphabet is binary, where black pixels represent 0s and white pixels represent 1s, or vice-versa. However more complex alphabets comprising more than two symbols can be considered. Thus, any pixel $p_i$ in the projected pattern P can be associated to a code word $c_i$, which is defined as an ordered set of N symbols from A. The number of symbols N in a code word determine the number of different code words (size of the code) that can be generated. In the case of a binary alphabet, the maximum size of the code is $2^N$. It is necessary to associate a unique code word to any pixel within the set itself to uniquely distinguish a pixel within a set.

It may at first glance appear necessary to associate a different code word to any point in P to compute correspondences between points in P and pixels in I. However by exploiting epipolar geometry constraints, valid correspondences can be restricted to occur only within epipolar lines. As described in the incorporated-by-reference Aquifi, Inc. patents enumerated earlier herein, moreover, in the case of a rectified system, one can restrict correspondences to occur only within the same horizontal line. Further, since acquisition cameras, e.g., 90R, 90L only image target objects in their FOV, constraints may purposefully be imposed on the maximum proximity of objects that are imaged. This allows further restriction on the set of possible correspondences and expedites finding the value of N such that there is at least a different code word per possible set of correspondences. For example, if camera 90R has a VGA sensor and was spaced apart say 40 mm from the location of emitted projected patterns from system 30 (see FIG. 1A), in a rectified system, measuring imaged scenes with minimum distance of about 200 mm would involve computing about 100 possible correspondences, which is a reasonable number of computations.

Associating a code-word of length N to any pixel in pattern P can be carried out using various known techniques including without limitation temporal and spatial multiplexing. In a temporal multiplexing approach, a set of N different patterns is projected within a time interval and each pattern is optically acquired, e.g., by a camera. The projected symbols for each pattern for each pixel constitute the code word, where codification of each pixel can be done independently from other pixels in the acquired image. In a spatial multiplexing approach, a single pattern is projected, and for each pixel $p_i$ the code word is constructed by looking at the values of the projected pattern in a neighborhood of $p_i$ of at least size N, where codification of one pixel depends on its neighbors. A further description of temporal and spatial multiplexing coding techniques is reported by J. Salvi, J. Pages, J. Bathe. "Pattern Codification Strategies in Structured Light Systems". The Journal of the Pattern Recognition Society, 2003.

In structured light coding systems a trade-off exists between the considered type of multiplexing and obtainable image resolution measurement in that dimension. For example in a temporal multiplexing approach a set of N different patterns has to be projected and acquired by the optical acquisition system. This provides an estimated depth-map every N frames of acquired optical images, which undesirably reduces temporal resolution for the system. In a spatial multiplexing approach, a certain neighborhood is used for coding.

In computing correspondence, algorithms are commonly based on block matching. It is assumed that the acquired scene is well approximated by a front-to-parallel plane in the considered coding neighborhood of each pixel. But if there is depth discontinuity this hypothesis is not justified with the undesired result that obtained depth estimates can be wrong. In practice, one can say that spatial multiplexing coding techniques reduce the spatial resolution (in terms of x-y) of the estimated depth-map.

As regards embodiments of the present invention in which two patterns are generated and projected, e.g., 50-1, 50-2, in some applications two patterns may not be sufficient to guarantee unique coding with a temporal multiplexing technique, and indeed temporal multiplexing may not be well suited for imaging dynamic scenes, e.g., where imaged target objects are moving relatively rapidly with respect to background scenery.

However combining spatial and temporal multiplexing techniques can enable an interesting coding approach to enable system 10 in FIG. 1A to be flexible in trading off temporal and spatial resolution. This spatio-temporal multiplexing approach is independent of the specific coding algorithm adopted. As such a variety of coding algorithms can be exploited by system 10, e.g., De Bruijn coding, m-array coding, and non-formal coding schemes. These and other algorithms are among the software routines stored in memory 120 in system 10 in FIG. 1A or in FIG. 2A. Spatio-temporal multiplexing techniques advantageously benefit from the ever increasing temporal resolution of generic two-dimensional cameras 90L, 90R. For example relatively inexpensive consumer grade cameras can now operate at 120 Hz frame rates. As such the rate at which system 10 can switch from projecting a first pattern to a second pattern can be made faster.

For ease of discussion, the following description will address the case of a temporal component of two patterns, but such simplification is made without imposing limitations for other cases.

A first strategy for exploiting spatio-temporal multiplexing is to generate two different patterns that both perform spatial coding with code words of length N'. At any pixel it is possible to combine the code words from the two patterns by concatenation. The order of concatenation should be the same for each pattern pixel to obtain code words of length N=2×N'. In this case, a depth map is estimated for every other frame of optical data acquired by cameras 90L, 90R (FIG. 1A, FIG. 2A) by performing the association in the obtained code-word.

It is possible however, with some approximation, to estimate a depth-map every frame by always exploiting the last two available acquired frames. Approximately it is possible to say that temporal resolution of the system is reduced by at maximum a factor of two. However, in this case spatial multiplexing is spread across two patterns, which enables an increase in spatial resolution by a factor of two with respect to a single-pattern solution. By extending this concept, it is possible to have spatial multiplexing windows whose sizes are different for each of the two projected patterns. Note that this concept can be extended to the case of more than two projectable patterns.

A specific embodiment of the presented techniques might also lead to patterns which are the same pattern but projected at different resolutions. The introduced methodologies for spatio-temporal multiplexing enables creation of a system characterized by one more degree of freedom with respect to either spatial or temporal multiplexing. This augmented introduced degree of freedom results from the ability to tune multiplexing techniques for the specific application for system 10 at hand. Note that the algorithm, e.g., 130-$x$ stored in memory 120 in FIG. 1A or FIG. 2A, can provide feedback for the choice of the next pattern to project. Thus system 10 can be implemented to intelligently decide the optimal trade-off solution between spatial and temporal resolution as a function of the specific framed scene acquired by cameras 90L, 90R.

For example if a imaged scene presently contains only static target objects, system 10 itself can decide to trade temporal resolution (which is not important, since framed objects are static) to obtain better spatial resolution. The maximum number of available patterns is considered for the depth estimation to achieve the better spatial resolution. If a moving target object, perhaps 60', 70 enters the scene, only a single pattern is used to computer the depth estimate, intelligently giving up spatial resolution to maximize temporal resolution. This dynamic real-time fine tuning can be implemented by providing feedback to SRPG 320 and altering sequence of projected patterns as a function of the acquired frame of image content, or by projecting the same sequence of patterns, selecting the number of frames of acquired image data to consider, and using an appropriate neighborhood to have uniquely decodable code words. In the latter option, the fewer frames considered, the bigger will be the neighborhood to be adopted, at sacrifice of spatial resolution.

As noted in some embodiments pattern projection from SRPG 320 is performed using two different regimes based on the nature of the scene: when the scene is dynamic, e.g. the camera or the objects in the scene are moving quickly, a single pattern is selected and projected onto the scene.

When the scene is static, multiple patterns are successively projected and three-dimensional reconstruction is performed by temporal integration (space-time stereo).

In a two-camera or stereoscopic system such as shown in FIG. 1A or FIG. 2A, the cameras, e.g., 90L, 90R will be calibrated and rigidly-linked with respect to each other and device 20. Camera calibration information provides the necessary information to rectify input images so that corresponding epipolar lines between left and right views are aligned. In such case, a three-dimensional point M(X,Y,Z) in the scene projects on the left and right images in m(x,y) and m'(x−d, y) respectively, where d is the so-called disparity.

Stereoscopic algorithms, storable in memory 120, e.g., 130-x, exploit this property and achieve three-dimensional depth map reconstruction by matching points between left and right views, which is equivalent to estimating disparities. Block matching (BM) is a commonly used stereoscopic algorithm.

Given a pixel m(x,y) in the left view a block matching algorithm computes for all disparities d the costs $c_m(d)$ to match m to m'(x−d, y) in the right view. The cost function is defined as the similarity between the n×n windows surrounding the prospective matches. The optimal disparity $\hat{d}(m)$ at point m is finally estimated as $\hat{d}(m)=\mathrm{argmin}_d(c_m(d))$. This procedure is commonly addressed as Winner-Takes-All (WTA). Since stereo algorithms like BM rely on appearance similarity, they require the imaged scene to be textured, so image points can confidently be matched across views. As such they provide inaccurate disparity estimates at points located in textureless or poorly textured regions.

Some active illumination systems seek to address the above noted limitation of stereoscopic algorithms by projecting a textured pattern onto the scene to be imaged. In essence by painting the scene with the textured pattern, an artificial surface texture is projected that allows image points to be matched across different views. See for example U.S. Pat. No. 7,970,177 to St. Hilaire et. al (2011). However in prior art such as St. Hilaire '177 a single immutable pattern is used to provide artificial texture for the stereoscopic system. Since the pattern is fixed and immutable, it cannot be dynamically changed so as to be optimal based on the nature of the imaged scenery. A preferred method is to project a set of patterns optimizable with respect to an algorithm that can subsequently be used to determine the z-depth of objects in an imaged scene, regardless of the nature of the scene or objects. For example, embodiments of the present invention recognize that the optimal projection pattern to aid a z depth stereo matching algorithm in assessing the depth of a fixed, textureless flat wall at a distance of 5 meters, is sub-optimal for assessing the depth of a coffee cup that is at a distance of 70 centimeters from the system. In methods that use a fixed, immutable projection pattern, it is not possible to project an optimal pattern based on the nature of the scene. By contrast, embodiments of the present invention employ an SRPG, e.g., 320, that can dynamically project an optimal pattern selected from a set of patterns based on the nature of the imaged scene. This performance is attained while still satisfying overall system power, form-factor, cost, and projection quality constraints. Thus, as depicted in FIG. 1A or in FIG. 2A or FIG. 3A or FIG. 4A, SPRG 320 within pattern projection system 30 enables projection of a desired pattern, e.g., 50-1, 50-2, from a lookup table 130-1 of available projectable patterns. Pattern selection preferably is based on optimality of quality criteria, ensuring a most accurate disparity estimation for a given scene, substantially independent of texture (or Tack of texture) in the imaged scene.

The ability of SRPG 230 to quickly switch between patterns also makes it suitable for use in space-time stereo techniques when the imaged scene is substantially static or at least quasi-static. In such techniques, N patterns are successively projected. The space-time stereo algorithm combines the N corresponding image pairs to compute disparities. In practice, the algorithm accumulates the matching costs over all frames.

$$c_m(d) = \sum_{k=1}^{N} c_m^{(k)}(d)$$

where $c_m(d)$ is the accumulated cost and $c_m^{(k)}(d)$ the cost computed at frame k. Accumulated cost is then used for the final disparity computation. Space-time stereo techniques provide highly accurate results but thus far their useable has been limited to laboratory environments. This is because they must switch projected patterns dynamically, which can only be accomplished by bulky, high-powered PC-projector systems. By contrast, embodiments of the present invention enable a lightweight, compact multi-pattern projector SRPG 230 that can readily deploy such techniques.

In structured-light stereo, patterns are usually designed such that cost computed via block-matching has a single minimum in the range of disparities. Range of disparities size determines the minimum horizontal periodicity of the pattern itself. In block matching approaches, block size determines maximum possible periodicity in the pattern. Realizing an efficient pattern preferably dictates that minimum required periodicity from disparity range constraints, and maximum possible periodicity from block-size constraints at least substantially coincide, e.g., are very similar. Since size of the selected block determines spatial resolution of the estimated depth map, ideally minimum block size that leads to unique matches in the considered range of disparities should be selected.

As noted embodiments of the present invention enjoy great flexibility in the type and nature of patterns to be projected. For example blocks or replicable sub-sets of the full projection pattern can be distributed for block-matching across multiple images. For example if at a distance z=2 m the full projection pattern covers an area 1 m×1 m, sub-blocks may be 10 cm×10 cm. Patterns may be optimized for block-matching algorithm(s) by reducing associated correspondence ambiguities in the patterns. The patterns can be selected similarly to the spatio-temporal coding strategies described earlier herein, with or without an actual coding scheme. For example, two patterns characterized by two different periodicities may be used per a matching algorithm, e.g., 130-x, characterized by a periodicity that is the least common multiple of the two periodicities, leading to a finer depth spatial resolution. Moreover the projected patterns could be designed based on coding considerations, perhaps a stereo-like system characterized by multiple coded patterns projections.

While simple block matching using WTA strategy is sufficient to estimate depth within the introduced framework, more advanced techniques are also available. Such alternative strategies include global methods perhaps based on graph-cuts or loopy-belief-propagation, complex cost aggregation strategies perhaps based on Birchfield-Tomasi analysis, bilateral filter, or non-local approaches), or plane-sweeping and slanted plane-sweeping techniques.

Modifications and variations may be made to the disclosed embodiments without departing from the subject and spirit of the invention as defined by the following claims.

What is claimed is:

1. A method for use with a multi-pattern projection system, coupleable to an acquisition system, to enhance dynamic reconstruction of a three-dimensional (x,y,z) depth map obtained from an imaged scene in which at least one target object may be present, said scene imaged by an acquisition system that optically acquires within a field of view (FOV) of said acquisition system at least a portion of said scene, said imaged scene processed by a processor system coupled to said acquisition system to yield said three-dimensional (x,y,z) depth map, the method including the following steps:

(a) providing a light source outputting optical energy;

(b) providing an electronically spatially reconfigurable pattern generator (SRPG) that includes:

a first diffractive optical element (DOE), characterized by a near field, disposed optically downstream from said light source so as to receive at least some of said optical energy;

a second DOE, characterized by a far field, disposed optically downstream from and within said near field of said first DOE, said first DOE and said second DOE being spaced-apart a distance Δz, said second DOE processing optical energy received from said first DOE and projecting a pattern P within said far field of said second DOE; and (c) providing means for electronically controllably varying effective optical length traversed by optical energy from said light source traversing from said first DOE to said second DOE;

wherein when said means for electronically controllably varying causes magnitude of said effective optical length to be a first distance said second DOE projects a first pattern P1 and when said means for controllably varying causes magnitude of said effective optical length to be a second distance said second DOE projects a second different pattern P2; and wherein disparity contributions resulting from presence of said first pattern P1 and said second pattern P2 in said scene enables a three-dimensional depth map of a target object in said scene to be more rapidly, and/or more accurately generated than if only one pattern were used.

2. The method of claim 1, wherein:

said acquisition system is provided with a first camera and a second camera spaced apart from said first camera, each camera being a two-dimensional camera and having a field of view; and said acquisition system FOV is defined by overlapping fields of view of said first camera and said second camera; and wherein at least a portion of said scene lies within overlapping fields of view of said first camera and said second camera.

3. The method of claim 2, wherein said first camera and said second camera are operated in at least one synchronism mode to enhance at least one of (i) actual depth information produced in the created said three-dimensional (x,y,z) depth map, (ii) quality of depth information produced in the created said three-dimensional (x,y,z) depth map, (iii) color information in imagery acquired by said acquisition system, (iv) z-depth information in imagery acquired by said acquisition system, (v) a shape of a target object in imagery acquired by said acquisition system, (vi) a surface property of a target object in imagery acquired by said acquisition system, and (vii) relative velocity of a target object in said imaged scene.

4. The method of claim 1, wherein step (a) includes providing a structured light system.

5. The method of claim 4, wherein:

at step (b), said first DOE is static; and at step (c), said means for electronically controllably varying is coupled to said second DOE and varies magnitude of $\Delta_z$ by moving said second DOE relative to said first DOE.

6. The method of claim 4, wherein at step (c), said means for electronically controllably varying alters magnitude of $\Delta_z$ with a granularity of about 1 μm to about 10 μm.

7. The method claim 1, wherein:

step (a) includes providing said light source having at least one characteristic selected from a group consisting of (i) said optical energy is coherent, (ii) said optical energy is at least substantially coherent, (iii) said optical energy has a wavelength visible to humans, (iv) said optical energy has an infrared wavelength, and (v) said light source is a laser diode.

8. The method of claim 1, wherein:

at step (c), said means for electronically controllably varying includes at least one mechanical actuator, coupled to one of said first DOE and said second DOE, to mechanically alter spaced-apart distance $\Delta_z$, to change magnitude of said effective optical length; and when said spaced-apart distance Δz is caused to have a first value said second DOE projects a first pattern P1 and when spaced-apart distance is caused to have a second value said second DOE projects a second different pattern P2.

9. The method of claim 8, wherein:

at step (c) said mechanical actuator includes at least one of: (i) an electro-mechanical actuator, (ii) a piezoelectric actuator, (iii) a linear voice coil motor actuator, and (iv) a mechanical-electro-mechanical (MEM) actuator.

10. The method of claim 1, wherein:

at step (c), said means for electronically controllably varying includes a spatial light modulator (SLM) disposed on a common optical axis with and sandwiched between said first DOE and said second DOE;

wherein in response to a first control signal said SLM presents a first effective optical length magnitude between said first DOE and said second DOE, and in response to a second control signal said SLM presents a second effective optical length magnitude between said first DOE and said second DOE, said first DOE and said second DOE being stationary relative to one another; and wherein when said effective optical length is said first magnitude, said second DOE projects a first pattern P1 and when said effective optical length is said second magnitude said second DOE projects a second different pattern P2.

11. The method of claim 1, wherein said at least one target object includes a portion of a human making a gesture, and wherein said method enables using acquired three-dimensional (x,y,z) depth data to recognize a gesture made by said human.

12. The method of claim 1, wherein said method is carried out within a handholdable battery-operable electronic device in which device said acquisition system is disposed.

13. The method of claim 1, including:

(I) a first pattern is generated and projected onto at least a portion of said scene, and imagery is acquired by said acquisition system;

(II) at least one routine executable by said processor system creates a three dimensional (x,y,z) depth map optimized for said scene acquired by said acquisition system;

(III) at least one routine executable by said processor system analyzes acquired said imagery to select a-new pattern to be projected, based upon information in acquired said imagery;

(IV) Δz is commanded to have a value commensurate with said new pattern selected at step (III);

(V) said new pattern is projected onto at least a portion of said scene, and imagery is acquired by said acquisition system;

(VI) steps (II), (Ill), (IV) and (V) are repeated.

14. The method of 13, wherein at step (II) selection of said second pattern takes into account at least one characteristic selected from a group consisting of (i) actual depth information produced in the created said three-dimensional (x,y,z) depth map, (ii) quality of depth information produced in the created said three-dimensional (x,y,z) depth map, (iii) color information in imagery acquired by said acquisition system, (iv) z-depth information in imagery acquired by said acquisition system, (v) a shape of a target object in imagery acquired by said acquisition system, (vi) a surface property of a target object in imagery acquired by said acquisition system, and (vi) relative velocity of a target object in said imaged scene.

15. A method for use with a multi-pattern projection system, coupleable to an acquisition system, to enhance dynamic reconstruction of a three-dimensional (x,y,z) depth map obtained from an imaged scene in which at least one target object may be present, said scene imaged by an acquisition system that optically acquires within a field of view (FOV) of said acquisition system at least a portion of said scene, said imaged scene processed by a processor system coupled to said acquisition system to yield said three-dimensional (x,y,z) depth map, the method including the following steps:

(a) providing a light source outputting optical energy;

(b) providing an electronically spatially reconfigurable pattern generator (SRPG) that includes:

a first diffractive optical element (DOE), characterized by a near field, disposed optically downstream from said light source so as to receive at least some of said optical energy;

a second DOE, characterized by a far field, disposed optically downstream from and within said near field of said first DOE, said first DOE and said second DOE being spaced-apart a distance $\Delta z$, said second DOE processing optical energy received from said first DOE and projecting a pattern P within said far field of said second DOE; and (c) providing means for electronically controllably varying effective optical length traversed by optical energy from said light source traversing from said first DOE to said second DOE;

wherein at step (c) when said means for electronically controllably varying causes magnitude of said effective optical length to be a first distance said second DOE projects a first pattern P1 having a first pattern resolution, and when said means for controllably varying causes magnitude of said effective optical length to be a second distance said second DOE projects said first pattern at a second different pattern resolution P1'; and wherein step (c) produces spatio-temporal multiplexing, and disparity contributions resulting from presence of said first pattern P1 at said first resolution, and said first pattern P1' at said second resolution in said scene enables a three-dimensional depth map of a target object in said scene to be more rapidly generated than if only one pattern resolution were projected and used.

16. The method of claim 15, wherein at step (c), each projected pattern is light coded and selected to implement a spatio-temporal depth reconstruction from two-dimensional optical data acquired by said acquisition system.

17. The method of claim 15, wherein:

said acquisition system is provided with a first camera and a second camera spaced apart from said first camera, each camera being a two-dimensional camera and having a field of view wherein said acquisition system FOV is defined by overlapping fields of view of said first camera and said second camera, wherein at least a portion of said scene lies within overlapping fields of view of said first camera and said second camera.

18. The method of claim 17, wherein said second camera is turned off at all times; and wherein at step (c), projected patterns are selected to implement a single-camera spatio-temporal light coding reconstruction from two-dimensional optical data acquired by said first camera.

19. The method of claim 17, wherein said first camera and said second camera are moved together relative to said at least one target object so as to scan said at least one target object;

wherein said three-dimensional (x,y,z) depth map represents an outer surface of said at least one target object.

20. The method of claim 17, wherein said at least one target object is scanned by carrying out at least one step selected from a group consisting of (I) moving together said first camera and said second camera while said at least one target object is stationary; and (II) keeping said first camera and said second camera stationary while moving said at least one target object.

* * * * *